US012602194B2

(12) United States Patent
Yoon et al.

(10) Patent No.: US 12,602,194 B2
(45) Date of Patent: Apr. 14, 2026

(54) XR DEVICE, ELECTRONIC DEVICE AND CONTROL METHOD THEREOF

(71) Applicant: SAMSUNG ELECTRONICS CO., LTD., Suwon-si (KR)

(72) Inventors: Heewoong Yoon, Suwon-si (KR); Jongah Kim, Suwon-si (KR); Kihyuk Lee, Suwon-si (KR); Donghan Lee, Suwon-si (KR); Gwangho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/008,325

(22) Filed: Jan. 2, 2025

(65) Prior Publication Data

US 2025/0165203 A1 May 22, 2025

Related U.S. Application Data

(63) Continuation of application No. PCT/KR2023/006416, filed on May 11, 2023.

(30) Foreign Application Priority Data

Aug. 4, 2022 (KR) ......................... 10-2022-0097157
Sep. 8, 2022 (KR) ......................... 10-2022-0114357

(51) Int. Cl.
*G06F 3/14* (2006.01)
*G06Q 20/30* (2012.01)
(Continued)

(52) U.S. Cl.
CPC ............. *G06F 3/14* (2013.01); *G06Q 20/308* (2020.05); *G06Q 20/40145* (2013.01); *G06Q 30/0641* (2013.01)

(58) Field of Classification Search
CPC . G06F 3/14; G06F 3/013; G06F 3/011; G06Q 20/308; G06Q 20/40145;
(Continued)

(56) References Cited

U.S. PATENT DOCUMENTS 9,143,402 B2    9/2015  Tinnakornsrisuphap et al.
9,235,701 B2 *  1/2016  Wu ......................... G06F 21/44
(Continued)

FOREIGN PATENT DOCUMENTS

EP          3 550 491 A1   10/2019
JP       2014-235717 A     12/2014
(Continued)

OTHER PUBLICATIONS

International Search Report (PCT/ISA/210) issued on Aug. 10, 2023 by the International Searching Authority in International Patent Application No. PCT/KR2023/006416.
(Continued)

*Primary Examiner* — Koosha Sharifi-Tafreshi
(74) *Attorney, Agent, or Firm* — Sughrue Mion, PLLC

(57) ABSTRACT

An XR device, an electronic device, and a control method thereof are provided. An XR device may include at least one display, at least one memory, at least one optical sensor including a receiver for detecting an optical signal encoded as a barcode and an emitter for outputting the optical signal encoded as the barcode, and at least one processor electrically connected with the display, the memory, and the optical sensor. The processor may generate a service request signal including a code indicating service information as at least a portion thereof, through the emitter, output the service request signal through the emitter, identify a code indicating user information from a service response signal received through the receiver when the service information includes
(Continued)

service information related to user registration and store the identified code in the memory.

20 Claims, 19 Drawing Sheets

(51) Int. Cl.
*G06Q 20/40* (2012.01)
*G06Q 30/0601* (2023.01)

(58) Field of Classification Search
CPC .......... G06Q 30/0641; G06Q 20/3274; G06Q 20/321; G06Q 20/3276; G06K 19/06; G06K 7/10; G06K 7/14; H04W 4/38; H04W 4/80; G06T 19/006; G02B 27/017; G02B 2027/0178
See application file for complete search history.

(56) References Cited

U.S. PATENT DOCUMENTS

| | | | |
|---|---|---|---|
| 9,983,409 | B2 | 5/2018 | Ueno et al. |
| 10,083,544 | B2 | 9/2018 | Chen et al. |
| 10,331,205 | B2 | 6/2019 | Kim et al. |
| 10,841,174 | B1 | 11/2020 | Ely et al. |
| 10,860,087 | B2 | 12/2020 | Kim et al. |
| 11,231,779 | B1 | 1/2022 | Sundberg et al. |
| 11,232,329 | B2 | 1/2022 | Choi et al. |
| 11,353,707 | B2 | 6/2022 | Kim et al. |
| 11,914,153 | B2 | 2/2024 | Kim et al. |
| 12,007,570 | B2 | 6/2024 | Kim et al. |
| 2018/0146501 | A1* | 5/2018 | Ling .................... G06K 7/1095 |
| 2018/0336332 | A1* | 11/2018 | Singh ..................... H04L 63/18 |
| 2019/0243472 | A1 | 8/2019 | Stafford et al. |
| 2020/0033560 | A1 | 1/2020 | Weber et al. |
| 2020/0380493 | A1 | 12/2020 | Morales et al. |
| 2021/0400094 | A1 | 12/2021 | Miller |

FOREIGN PATENT DOCUMENTS

| | | | |
|---|---|---|---|
| JP | 2017-33128 | A | 2/2017 |
| JP | 6724819 | B2 | 7/2020 |
| JP | 2022-41765 | A | 3/2022 |
| KR | 10-0204927 | B1 | 6/1999 |
| KR | 10-2001-0086825 | A | 9/2001 |
| KR | 10-2020-0086449 | A | 7/2020 |
| KR | 10-2021-0025093 | A | 3/2021 |
| KR | 10-2021-0064952 | A | 6/2021 |
| KR | 10-2022-0002756 | A | 1/2022 |
| KR | 10-2022-0010293 | A | 1/2022 |
| KR | 10-2358548 | B1 | 2/2022 |
| WO | 2016/071244 | A2 | 5/2016 |

OTHER PUBLICATIONS

Written Opinion (PCT/ISA/237) issued on Aug. 10, 2023 by the International Searching Authority in International Patent Application No. PCT/KR2023/006416.
Communication issued on Sep. 30, 2024 by the European Patent Office in European Patent Application No. 23724157.5.

* cited by examiner

*FIG.18*

XR DEVICE, ELECTRONIC DEVICE AND CONTROL METHOD THEREOF

CROSS-REFERENCE TO RELATED APPLICATIONS

This application is a bypass continuation application of International Application No. PCT/KR2023/006416, filed on May 11, 2023, claiming priority to Korean Patent Application No. 10-2022-0097157, filed on Aug. 4, 2022, in the Korean Intellectual Property Office and Korean Patent Application No. 10-2022-0114357, filed on Sep. 8, 2022, in the Korean Intellectual Property Office, the disclosures of each of which are hereby incorporated by reference herein in their entireties.

BACKGROUND

1. Field

The disclosure relates to an extended reality (XR) device, an electronic device, and a control method thereof.

2. Description of Related Art

An extended reality (XR) system may generally include a computer-generated or real-world environment that may include at least some XR artifacts. The XR system or world, and associated XR artifacts may typically include various applications (e.g., video games) that allow users to use the XR artifacts by manipulating their presence in the form a computer-generated expression (e.g., avatar). In typical XR systems, image data may be rendered on a secure head-mounted display device (HMD), which may be coupled to a base graphics generation device in charge of generation of the image data via a physical wired connection.

SUMMARY

Many mobile terminals now allow users to easily unlock the terminal or perform other operations using facial and/or iris recognition software. However, when the user is wearing glasses or an XR device (headset, glasses, goggles or other wearable XR apparatus), the successful facial and iris recognition rate is severely reduced.

Furthermore, different users have different physical features such as face shapes, visual acuity, distance between eyes, focal length etc. This means that when an XR device is shared between multiple users, such as family members and friends, the XR device may have to be physically altered for each different user due to the physical differences of the users. This can be inconvenient, time consuming and difficult for the user to perform, and can detract from the overall experience of using the XR device. Alternatively, each of the plurality of users all have to experience the same user interface, physical or other settings of the XR device, which leads some users to have a less than optimal experience if the settings do not match the physical needs and requirements of the user.

The disclosure improves the interconnectivity and reliability between an XR device and a mobile device by using an optical sensor in the XR device. This allows a user to use the XR device more easily and naturally and improves the user experience.

An XR device needs to transmit/receive information (e.g., user information) about the XR device to/from another electronic device (e.g., mobile terminal) via a communication unit of the XR device before the XR device and the another electronic device wirelessly connect (e.g., pair) together.

An XR device according to an embodiment of the disclosure may comprise a display, memory, an optical sensor including a receiver for detecting an optical signal encoded as a barcode and an emitter for outputting the optical signal encoded as the barcode, and a processor electrically connected with the display, the memory, and the optical sensor. In an embodiment, the processor may generate a service request signal including a code indicating service information associated with a user registration. In an embodiment, the processor may output the service request signal through the emitter. In an embodiment, the processor may identify a code indicating user information from a service response signal received through the receiver when the service information includes service information related to user registration. In an embodiment, the processor may store the second code in the memory. As such, it is possible to register and identify user-related information before wireless pairing between the XR device and UE through authentication and registration using the optical sensor and to provide a user-adaptive use environment.

An electronic device according to an embodiment of the disclosure may comprise a transceiver, a display, memory, an optical sensor including a receiver for detecting an optical signal encoded as a barcode and an emitter for outputting the optical signal encoded as the barcode, and a processor electrically connected with the transceiver, the display, the memory, and the optical sensor. In an embodiment, the processor may generate a service request signal including a first code for device connection through the emitter. In an embodiment, the processor may output the service request signal. In an embodiment, the processor may identify a second code indicating user information from a service response signal received through the receiver. In an embodiment, based on the user information identified from the service response signal corresponding to user information previously stored in the memory, the processor may control the transceiver to transmit a message for requesting wireless connection to an electronic device providing the service response signal. As such, it is possible to register and identify user-related information before wireless pairing between the XR device and UE through authentication and registration using the optical sensor and to provide a user-adaptive use environment.

An electronic device according to an embodiment of the disclosure may comprise a transceiver, a display, memory, an optical sensor including a receiver for detecting an optical signal encoded as a barcode and an emitter for outputting the optical signal encoded as the barcode, and a processor electrically connected with the transceiver, the display, the memory, and the optical sensor. In an embodiment, the processor may detect a service request signal through the receiver. In an embodiment, the processor may generate a service response signal including user information based on identifying service information requesting device connection from the service request signal. In an embodiment, the processor may output the service response signal through the emitter. In an embodiment, the processor may form wireless connection with a device outputting the service request signal in response to receiving a wireless connection request from the device through the transceiver. As such, it is possible to register and identify user-related information before wireless pairing between the XR device and UE through authentication and registration using the optical sensor and to provide a user-adaptive use environment.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 17 and 18 illustrate an example of implementing an electronic payment using an XR device according to an embodiment.

Figure 1:
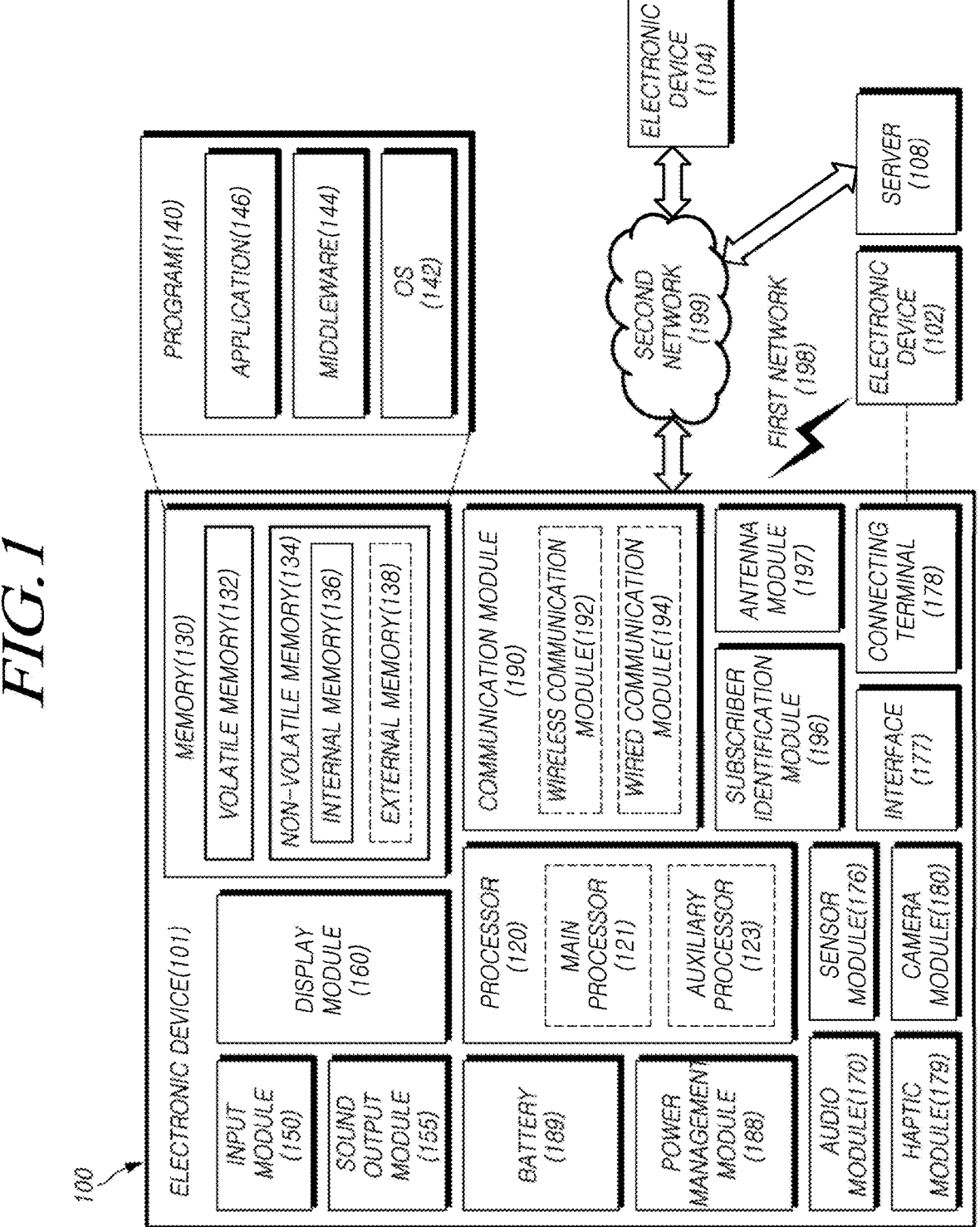
FIG. 1 is a block diagram illustrating an electronic device in a network environment according to various embodiments.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a view illustrating an electronic device in a network environment according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
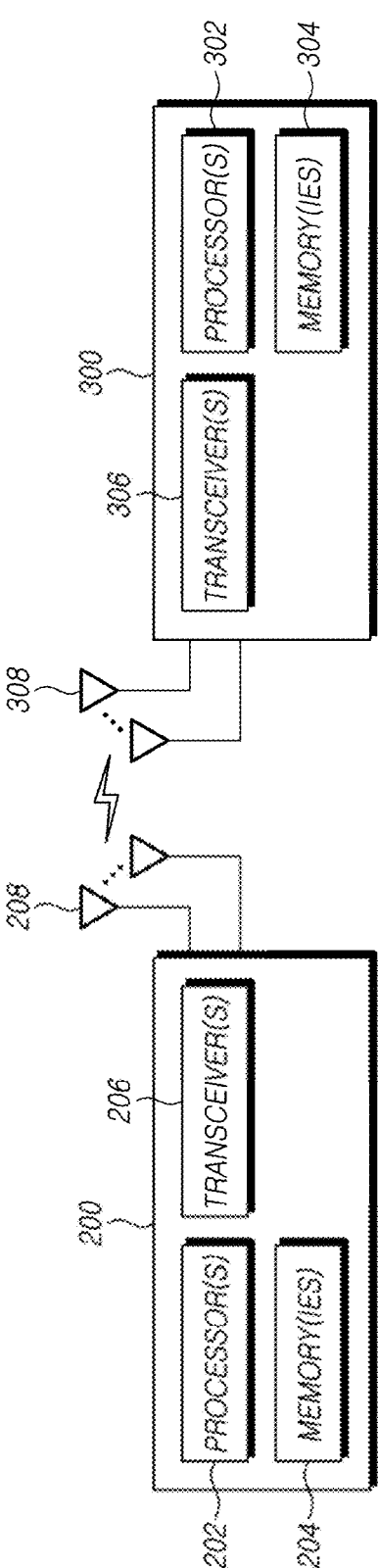
FIG. 2 is a block diagram illustrating an example wireless device according to an embodiment.

FIG. 2 is a block diagram illustrating an example wireless device according to an embodiment.

Referring to FIG. 2, a first wireless device 200 and a second wireless device 300 may transmit/receive radio signals through various radio access technologies (e.g., LTE or NR). The first wireless device 200 and the second wireless device 300 may correspond to the electronic device of FIG. 1.

The first wireless device 200 may include one or more processors 202 and one or more memories 204, and may additionally include one or more transceivers 206 and/or one or more antennas 208. The processor 202 may control the memory 204 and/or the transceiver 206 and may be configured to implement the functions, procedures and/or methods described/suggested above. For example, the processor 202 may process information in the memory 204 to generate first information and/or a first signal, and transmit a radio signal including the first information/signal through the transceiver 206. Further, the processor 202 may receive a radio signal including a second information/signal through the transceiver 206 and store information obtained as a result of performing signal processing on the second information/ signal in the memory 204. The memory 204 may be coupled with the processor 202 and store various pieces of information related to the operation of the processor 202. For example, the memory 204 may store software code including commands to perform the above-described/proposed procedures and/or methods or perform all or some of the processes controlled by the processor 202. The processor 202 and the memory 204 may be part of the communication modem/circuit/chip designed to implement radio communication technology (e.g., LTE or NR). The transceiver 206 may be connected with the processor 202 and transmit and/or receive radio signals through the one or more antennas 208. The transceiver 206 may include a transmitter and/or a receiver. The transceiver 206 may be interchangeably used with a radio frequency (RF) unit. In the disclosure, the wireless device may mean a communication modem/circuit/chip.

The second wireless device 300 may include one or more processors 302 and one or more memories 304, and may additionally include one or more transceivers 306 and/or one or more antennas 308. The processor 302 may control the memory 304 and/or the transceiver 306 and may be configured to implement the functions, procedures and/or methods described/suggested above. For example, the processor 302 may process information in the memory 304 to generate a third information/signal, and transmit a radio signal including the third information/signal through the transceiver 306. Further, the processor 302 may receive a radio signal including a fourth information/signal through the transceiver 306 and store information obtained as a result of performing signal processing on the fourth information/signal in the memory 304. The memory 304 may be coupled with the processor 302 and store various pieces of information related to the operation of the processor 302. For example, the memory 304 may store software code including commands to perform the above-described/proposed procedures and/or methods or perform all or some of the processes controlled by the processor 302. The processor 302 and the memory 304 may be part of the communication modem/circuit/chip designed to implement radio communication technology (e.g., LTE or NR). The transceiver 306 may be connected with the processor 302 and transmit and/or receive radio signals through the one or more antennas 308. The transceiver 306 may include a transmitter and/or a receiver. The transceiver 306 may be interchangeably used with an RF unit. In the disclosure, the wireless device may mean a communication modem/circuit/chip.

Hardware elements of the wireless devices 200 and 300 are described below in greater detail. Although not limited thereto, one or more protocol layers may be implemented by one or more processors 202 and 302. For example, one or more processors 202 and 302 may implement one or more layers (e.g., functional layers, such as PHY, MAC, RLC, PDCP, RRC, and SDAP). One or more processors 202 and 302 may generate one or more protocol data units (PDUs) and/or one or more service data units (SDUs) according to functions, procedures, proposals and/or methods disclosed herein. One or more processors 202 and 302 may generate messages, control information, data or information according to functions, procedures, proposals and/or methods disclosed herein. One or more processors 202 and 302 may generate signals (e.g., baseband signals) including PDUs, SDUs, messages, control information, data or information according to the functions, procedures, proposals and/or methods disclosed herein, and provide the signals to one or more transceivers 206 and 306. One or more processors 202 and 302 may receive signals (e.g., baseband signals) from one or more transceivers 206 and 306, obtaining the PDUs, SDUs, messages, control information, data or information according to the functions, procedures, proposals and/or methods disclosed herein.

One or more processors 202 and 302 may be referred to as a controller, microcontroller, microprocessor or microcomputer. One or more processors 202 and 302 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs) or one or more field programmable gate arrays (FPGAs) may be included in one or more processors 202 and 302. The functions, procedures, proposals and/or methods disclosed herein may be implemented using firmware or software, and the firmware or software may be implemented to include modules, procedures, or functions. The firmware or software configured to perform the functions, procedures, proposals and/or methods disclosed herein may be included in one or more processors 202 and 302 or be stored in one or more memories 204 and 304 to be driven by one or more processors 202 and 302. The functions, procedures, proposals and methods disclosed herein may be implemented using firmware or software in the form of codes, instructions and/or sets of instructions.

One or more memories 204 and 304 may be coupled with one or more processors 202 and 302 and may store various forms of data, signals, messages, information, programs, codes, instructions and/or commands. One or more memories 204 and 304 may be configured of ROM, RAM, EPROM, flash memory, hard drives, registers, cache memory, computer readable storage media, and/or combinations thereof. One or more memories 204 and 304 may be positioned inside and/or outside one or more processors 202 and 302. Further, one or more memories 204 and 304 may be connected to one or more processors 202 and 302 through various technologies, such as wired or wireless connections.

One or more transceivers 206 and 306 may transmit the user data, control information, and radio signals/channels, also mentioned in the methods and/or operation flowcharts of the disclosure, to one or more other devices. One or more transceivers 206 and 306 may receive user data, control information, and radio signals/channels, also mentioned in the functions, procedures, proposals, methods and/or operation flowcharts disclosed herein, from one or more other devices. For example, one or more transceivers 206 and 306 may be coupled with one or more processors 202 and 302 to transmit/receive radio signals. For example, one or more processors 202 and 302 may control one or more transceivers 206 and 306 to transmit user data, control information, or radio signals to one or more other devices. Further, one or more processors 202 and 302 may control one or more transceivers 206 and 306 to receive user data, control information, or radio signals from one or more other devices. Further, one or more transceivers 206 and 306 may be connected with one or more antennas 208 and 308. One or more transceivers 206 and 306 may be configured to transmit/receive user data, control information, and radio signals/channels, mentioned in the functions, procedures, proposals, methods, and/or operation flowcharts disclosed herein through one or more antennas 208 and 308. In the disclosure, one or more antennas may be a plurality of physical antennas or a plurality of logical antennas (e.g., antenna ports). One or more transceivers 206 and 306 may convert the received radio signals/channels from RF band signals to baseband signals to process the received user data, control information, and radio signals/channels by one or more processors 202 and 302. The one or more transceivers 206 and 306 may convert user data, control information, and radio signals/channels processed by the one or more processors 202 and 302 from baseband signals to RF band signals. To that end, one or more transceivers 206 and 306 may include an (analog) oscillator and/or filter.

Figure 3:
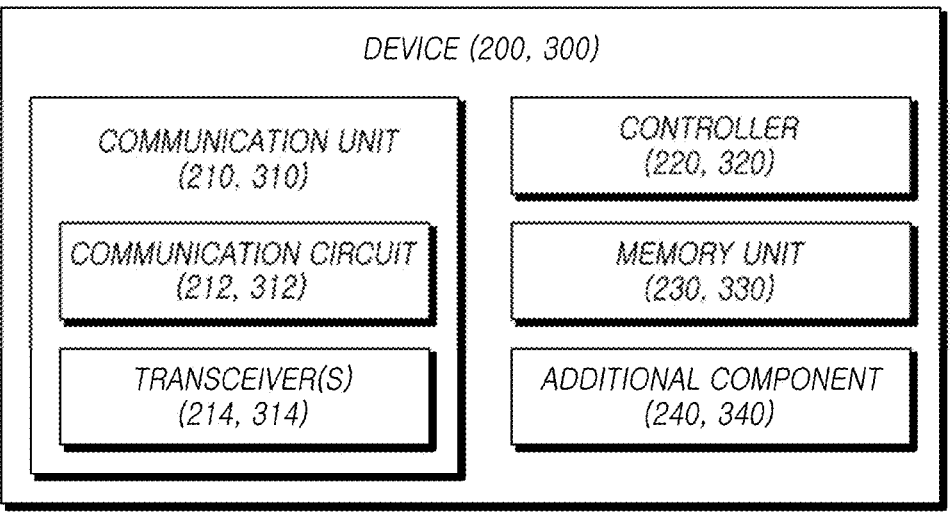
FIG. 3 illustrates an example wireless device applicable to an embodiment, wherein the wireless device may be implemented in various forms according to the purpose of or services provided by the example wireless device.

FIG. 3 illustrates an example wireless device applicable to an embodiment. The wireless device may be implemented in various forms according to the function and/or services provided by the wireless device.

Referring to FIG. 3, a wireless device 200 or 300 may correspond to the wireless device 200 or 300 of FIG. 2, and include various elements, components, units/parts, and/or modules. For example, the wireless device 200 may include a communication unit 210, a controller 220, a memory unit 230, and an additional element 240. The wireless device 300 may include a communication unit 310, a controller 320, a memory unit 330, and an additional element 340. The communication unit 310, the controller 320, the memory unit 330, and the additional element 340 constituting the wireless device 300 may correspond to the communication unit 210, the controller 220, the memory unit 230, and the additional element 240 constituting the wireless device 200, and no duplicate description is given below.

The communication unit 210 may include a communication circuit 212 and transceiver(s) 214 (or transceiver(s)). For example, the communication circuit 212 may include one or more processors 202 and 302 and/or one or more memories 204 and 304 of FIG. 2. For example, the transceiver(s) 214 may include one or more transceivers 206 and 306 and/or one or more antennas 208 and 308 of FIG. 2.

The controller 220 is electrically connected with the communication unit 210, the memory unit 230, and the additional element 240, and controls the overall operation of the wireless device. For example, the controller 220 may control the electrical/mechanical operations of the wireless device based on programs/codes/instructions/information stored in the memory unit 230. Further, the control unit 220 may transmit the information stored in the memory unit 230 to the outside (e.g., another communication device) through the communication unit 210 and through a wireless/wired interface or may store, in the memory unit 230, the information received through the wireless/wired interface from the outside (e.g., the other communication device) through the communication unit 210.

Various additional elements 240 may be configured depending on the type of the wireless device. For example, the additional element 240 may include at least one of a power unit/battery, an input/output unit (I/O unit), a driving unit, and a computing unit. The wireless device may be implemented as a robot, vehicle, XR device, portable device, home appliance, IoT device, terminal for digital broadcasting, hologram device, public safety device, MTC device, medical device, fintech device (or financial device), security device, climate/environment device, AI server/device, base station, or network node, but is not limited thereto. The wireless device may be mobile or used in a fixed location depending on the use-example/service.

In FIG. 3, various elements, components, units/parts, and/or modules in the wireless device 200 or 300 may be all interconnected through a wired interface, or at least some thereof may be wirelessly connected through the communication unit 210. For example, in the wireless device 200 or 300, the controller 220 and the communication unit 210 may be connected with each other via physical wires, and the controller 220 and a first unit (e.g., 230 or 240) may be wirelessly connected with each other through the communication unit 210. Further, each element, component, unit/part, and/or module in the wireless device 200 or 300 may further include one or more elements. For example, the controller 220 may be configured as one or more processor sets. For example, the controller 220 may be configured as a set of a communication control processor, an application processor, an electronic control unit (ECU), a graphic processing processor, and a memory control processor. As another example, the memory unit 230 may be configured as a random access memory (RAM), a dynamic RAM (DRAM), a read only memory (ROM), a flash memory, a volatile memory, and a non-volatile memory and/or a combination thereof.

The implementation example of FIG. 3 is described below in greater detail with reference to the drawings.

Figure 4:
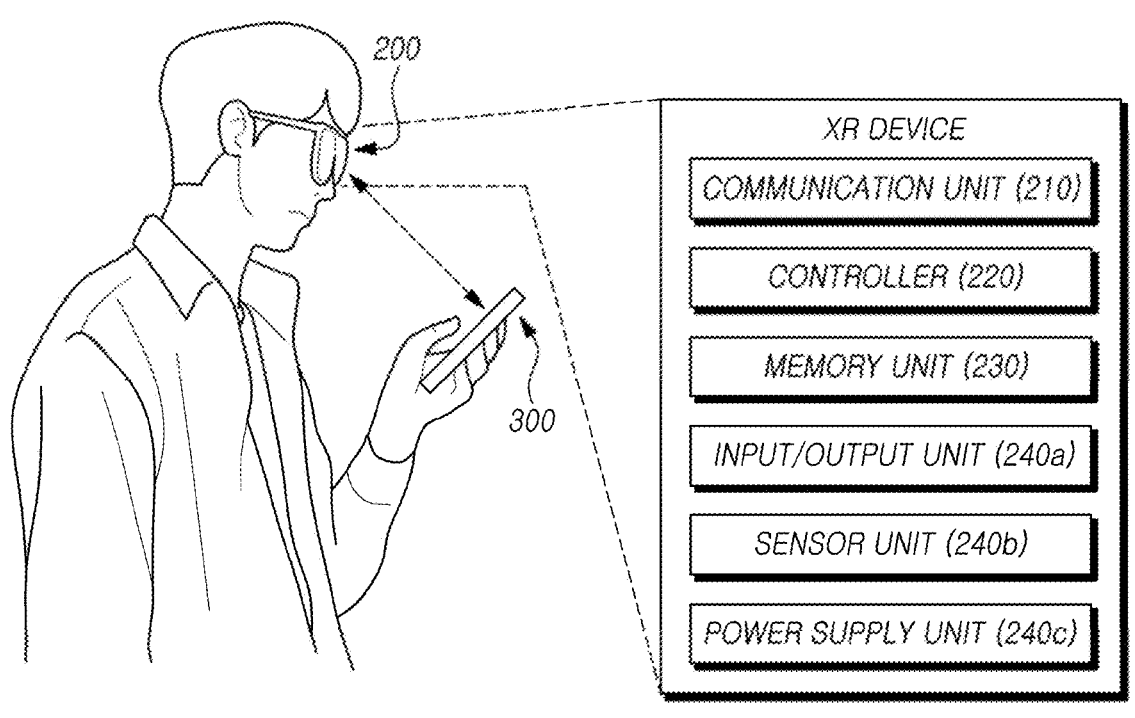
FIG. 4 illustrates an XR device applicable to an embodiment.

FIG. 4 illustrates an XR device applicable to an embodiment of the disclosure.

The XR device may be implemented as an HMD, a head-up display (HUD) provided in a vehicle, a television, a smartphone, a computer, a wearable device, a home appliance, a digital signage, a vehicle, or a robot, but is not limited thereto.

The XR device 200 may include a communication unit 210, a controller 220, a memory unit 230, an input/output unit 240a, a sensor unit 240b, and a power supply unit 240c. Blocks 210 to 240 may respectively correspond to blocks 210 to 240 of FIG. 3.

The communication unit 210 may transmit/receive signals (e.g., media data or control signals) to/from external devices, such as other wireless devices, portable devices, or media servers. The media data may include video, images, and/or sound. The controller 220 may control the components of the XR device 200 to perform various operations. For example, the controller 220 may be configured to control and/or perform procedures, such as video/image obtaining, (video/image) encoding, metadata generation and processing. The memory unit 230 may store data/parameters/programs/codes/commands necessary for driving the XR device 200/creating XR objects. The input/output unit 240a may obtain control information or data from the external environment and output the created XR object. The input/output unit 240a may include a camera, a microphone, a user input unit, a display unit, a speaker, and/or a haptic module. The sensor unit 240b may sense the XR device state, ambient environment information, and/or user information. The sensor unit 240b may include, e.g., a proximity sensor, an illuminance sensor, an acceleration sensor, a magnetic sensor, a gyro sensor, an inertia sensor, a red-green-blue (RGB) sensor, an infrared (IR) sensor, a fingerprint recognition sensor, an ultrasonic sensor, an optical sensor, a microphone, and/or a radar. The power supply unit 240c may supply power to the XR device 200 and may include a wired/wireless charging circuit and/or a battery.

For example, the memory unit 230 of the XR device 200 may include information (e.g., data) necessary for creating an XR object (e.g., AR/VR/MR object). The input/output unit 240a may obtain a command to operate the XR device 200 from the user. The controller 220 may drive the XR device 200 according to the user's driving command or inputs. For example, when the user watches a movie or news through the XR device 200, the controller 220 may transmit content request information to another device (e.g., the portable device 300) or a media server through the communication unit 210. The communication unit 210 may download/stream content, such as movies and news, from the other device (e.g., the portable device 300) or the media server to the memory unit 230. The controller 220 may control and/or perform a procedure, such as video/image obtaining, (video/image) encoding, or metadata creation/processing, on the content and create/output an XR object based on information about the real-world object or ambient space obtained through the input/output unit 240a/sensor unit 240b.

Further, the XR device 200 may be wirelessly connected with the portable device 300 through the communication unit 210, and the operation of the XR device 200 may be controlled by the portable device 300. For example, the portable device 300 may act as a controller for the XR device 200. To that end, the XR device 200 may obtain three-dimensional (3D) location information about the portable device 300 and then create and output an XR object corresponding to the portable device 300.

Figure 5:
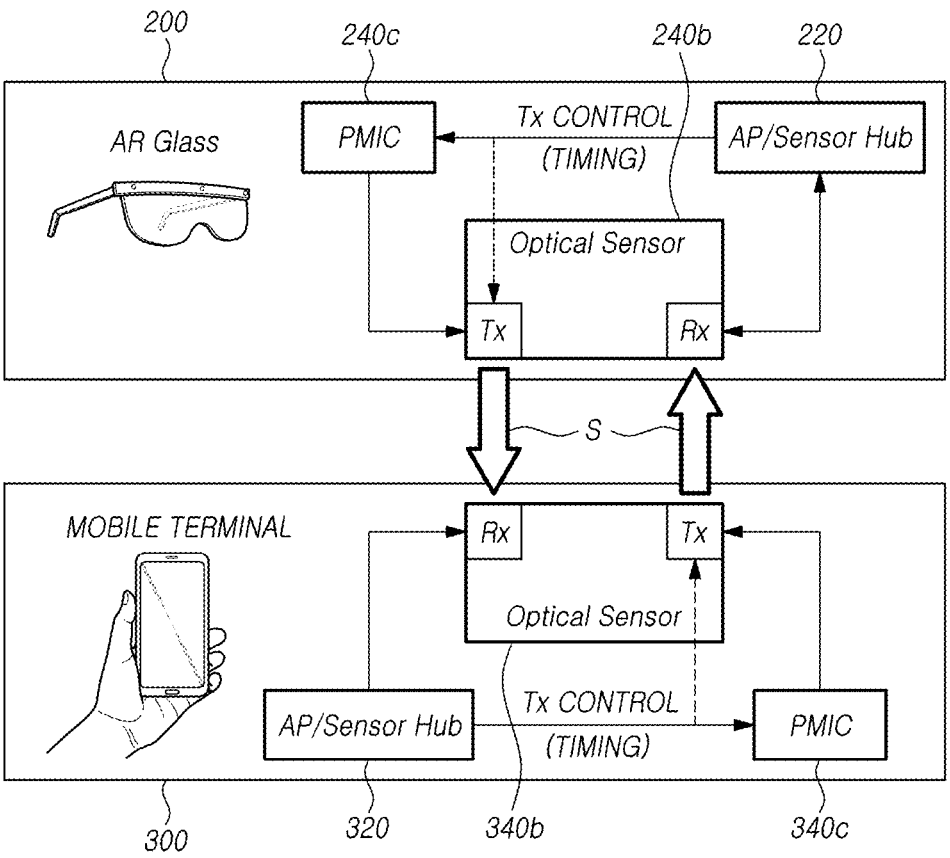
FIG. 5 illustrates an example XR system according to an embodiment.

FIG. 5 illustrates an example XR system according to an embodiment.

Referring to FIG. 5, an XR system according to an embodiment may include an XR device 200 and a mobile terminal (e.g., the wireless device 300 of FIG. 3 or the portable device 300 of FIG. 4). Here, the XR device 200 may correspond to the electronic device described with reference to FIGS. 1 to 3 and/or the XR device shown in FIG. 4, and the mobile terminal may be understood as corresponding to the electronic device described with reference to FIGS. 1 to 3.

In an embodiment, the XR device 200 may include one or more first processors 220, one or more first power management modules 240c, and one or more first optical sensors 240b.

In an embodiment, the mobile terminal 300 may include one or more second processors 320, one or more second power management modules 340c, and one or more second optical sensors 340b. Here, the second processor 320, the second power management module 340c, and the second optical sensor 340b may be understood as corresponding to the first processor 220, the first power management module 240c, and the first optical sensor 240b, respectively.

In an embodiment, the processors 220 and 320 may be implemented as the application processors 220 and 320, but are not limited thereto. In an embodiment, the processors 220 and 320 may be understood as sensor hubs, but are not limited thereto.

Although not limited thereto, in an embodiment, the processors 220 and 320 may be configured to include at least one of a central processing unit (CPU) or a microcontroller unit (MCU). For example, the CPU may control other semiconductor chips, control power, or perform calculations. For example, the MCU may process sensing data obtained from various sensors. In an embodiment, the MCU may be implemented as a sensor hub, but is not limited thereto.

In an embodiment, the power management modules 240c and 340c may include a power management integrated circuit (PMIC) as at least part thereof. For example, the PMIC may supply power to other semiconductor chips. In an embodiment, the PMIC may be controlled by the processor 220 or 320 (e.g., CPU or MCU). In an embodiment, the PMIC may drive Tx and Rx of the optical sensors 240b and 340b by supplying power to the optical sensors 240b and 340b.

In an embodiment, the optical sensors 240b and 340b may be configured to include an emitter Tx, a receiver Rx, and an ASIC, but are not limited thereto. For example, the emitter Tx may include any one of an LED and an OLED. In an embodiment, the optical sensors 240b and 340b may include an opening for emitting light generated by the emitter Tx or receiving external light through the receiver Rx. In an embodiment, the optical sensors 240b and 340b may be provided with a molding or cap so that external light is not directly received toward the receiver Rx. For example, the molding or cap may be designed as a structure surrounding the receiver Rx.

In an embodiment, the emission time or emission timing of the emitter Tx may be controlled by the PMIC or one or more processors 220 and 320. In an embodiment, the receiver Rx may transfer the sensed data to one or more processors 220 and 320.

In an embodiment, the XR device 200 and the mobile terminal 300 may output or identify an optical signal S through their respective optical sensors 240b and 340b. The transmission and reception of the optical signal S are described below.

Figure 6:
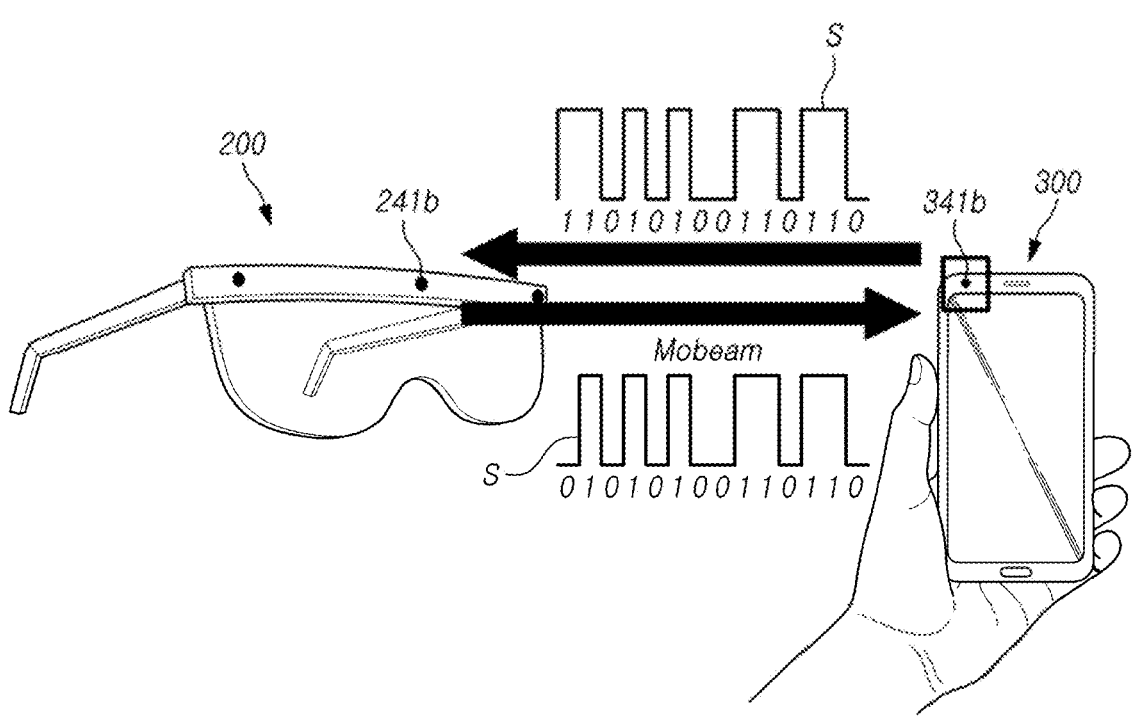
FIG. 6 illustrates an example of outputting and identifying an optical signal of an XR system according to an embodiment.

FIG. 6 illustrates an example of outputting and identifying an optical signal of an XR system according to an embodiment.

In an embodiment, the XR device 200 and the mobile terminal 300 may include optical sensors 241b and 341b. In an embodiment, the optical sensors 241b and 341b may include one or more emitters and one or more receivers.

In an embodiment, the one or more emitters may output light in an invisible band. The invisible band (or invisible light band) may be a band of light with frequencies/wavelengths which are not typically visible by the human eye. For example, the one or more emitters may output light in an infrared band, or an ultraviolet band, but are not limited thereto. For example, the emitter may include or be implemented with one or more LED elements, or one or more OLED elements.

In an embodiment, the one or more receivers may detect light in an invisible band. For example, the one or more receivers may detect light in an infrared band, or an ultraviolet band, but are not limited thereto.

In an embodiment, the one or more optical filters may be provided on the light receiving side of the optical sensors 241b and 341b. In an embodiment, the optical filter may filter light in the visible light wavelength band and transmit light in the invisible light wavelength band. Here, the invisible light wavelength band may include, e.g., an infrared band, or an ultraviolet band, but is not limited thereto.

In an embodiment, the XR device 200 may output an optical signal S toward the mobile terminal 300 through the optical sensor 241b. In an embodiment, the mobile device may output an optical signal S toward the XR device 200 through the optical sensor 341b. In an embodiment, the wavelength band of the light output or detected by the XR device 200 may be designed to be substantially the same, but is not limited thereto. That is, the XR device may be configured such that the wavelength band of the light output or transmitted by the XR device is substantially the same as the wavelength band of the light detected by the optical sensors of the XR device. In an embodiment, the wavelength band of the light output or detected by the mobile terminal 300 may be designed to be substantially the same, but is not limited thereto. That is, the mobile terminal may be configured such that the wavelength band of the light output or transmitted by the mobile terminal is substantially the same as the wavelength band of the light detected by the optical sensors of the mobile terminal.

In an embodiment, the optical signals S that the XR device 200 and the mobile terminal 300 output to each other may be provided in a form in which predetermined information is encoded. For example, the optical signal S may be implemented as a barcode-type optical signal S. A barcode generally refers to a series of patterns in which black lines and white lines are arranged with predetermined intervals and thicknesses. The barcode-type optical signal S of the disclosure means a signal expressing a pattern, such as a barcode, through light. The barcode-type optical signal S is described below with reference to FIG. 7.

Figure 7:
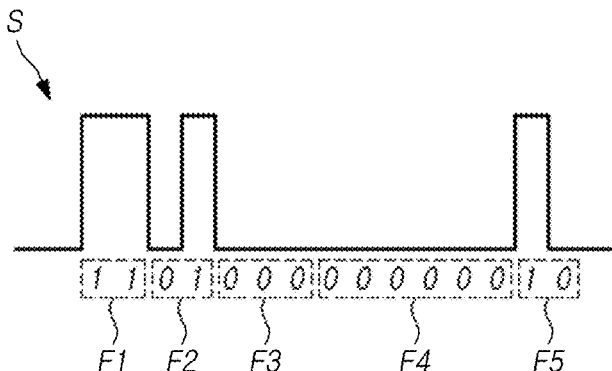
FIG. 7 illustrates an example optical signal according to an embodiment.

FIG. 7 illustrates an example optical signal according to an embodiment.

Referring to FIG. 7, according to an embodiment of the disclosure, the optical signal S may be provided as a barcode-type optical signal S. For example, '1' may indicate a high level and '0' may indicate a low level, and a series of codes may create an optical signal S with a series of waveforms. Here, the high level of the optical signal S may be defined as a portion where light is projected by the emitter (e.g., Tx of FIG. 5) of the optical sensor (e.g., the optical sensor 240*b* or 340*b* of FIG. 5), and the low level of the optical signal S may be defined as a portion where light is not projected by the emitter (e.g., Rx of FIG. 5) of the optical sensor. In other words, the barcode-type optical signal S may constitute a portion with the high level and a portion with the low level, and a predetermined barcode pattern defined by the high level and the low level may be formed. The formed barcode pattern may be projected by the emitter of the optical sensor.

In an embodiment, when the optical sensor outputs light in a visible light band, the optical signal S generated based on encoded information may be represented as a predetermined barcode pattern. In this case, the user may visually identify the represented barcode pattern through her eyes. Further, the XR device 200 or the mobile terminal 300 may identify the predetermined barcode pattern through the receiver provided in their respective optical sensors. In this case, the receiver may be designed or configured to receive or identify light in the visible light band.

In an embodiment, when the optical sensor outputs light in an invisible light band, the optical signal S generated based on encoded information may be represented as a predetermined barcode pattern. In this case, the user may not visually identify the represented barcode pattern through her eyes, but the XR device 200 or the mobile terminal 300 may identify the predetermined barcode pattern through the receiver provided in their respective optical sensors. In this case, the receiver may be designed or configured to receive or identify light in the invisible light band.

In an embodiment, the optical signal S may include encoded information. In an embodiment, the encoded information may be represented as a predetermined code. Here, the code is exemplified as a binary code, but the code is not limited thereto.

In an embodiment, the encoded information may be included in each field of the optical signal S. Although not limited thereto, the optical signal S may include at least one of a first field F1, a second field F2, a third field F3, a fourth field F4, and a fifth field F5. For example, the optical signal S may include the first to third fields F3. For example, the optical signal S may include the second and third fields F3. For example, the optical signal S may include the first to fourth fields F4. For example, the optical signal S may include the second to fourth fields F4. For example, the above-described optical signal(s) S may further include the fifth field F5. That is, the optical signal S may include at least any of the aforementioned fields in any combination.

In an embodiment, the first field F1 may indicate an ACK/NACK. An ACK may be a response signal which indicates an acknowledgement or receipt of a message or signal sent by another device. A NACK may be a response signal which indicates an error with, or a rejection of, a received message or signal sent by another device. A dummy NACK may be an alternative signal to indicate that the receiver has received the signal or message from another device. In an embodiment, the first field F1 may indicate at least one of an ACK, an NACK, or a dummy NACK. For example, the first field F1 may constitute at least 2 bits. When the first field F1 is configured as a code representing an ACK, the receiving-side device may identify the optical signal S as an ACK signal based on the code constituting the first field F1. When the first field F1 is configured as a code representing an NACK, the receiving-side device may identify the optical signal S as an NACK signal based on the code constituting the first field F1. When the first field F1 is configured as a code representing a dummy NACK, the receiving-side device may identify the transmitting-side device as a device first transmitting the optical signal S, based on the code constituting the first field F1.

In an embodiment, the second field F2 may indicate the transmission entity. In an embodiment, the receiving-side device may identify the type of the transmitting-side device (e.g., the XR device 200 or mobile terminal 300) based on the second field F2. In an embodiment, the receiving-side device may identify the transmitting-side device as the XR device 200 or the mobile terminal 300 based on the code constituting the second field F2.

In an embodiment, the second field F2 may indicate the transmission/reception entity. In an embodiment, the second field F2 may be configured to have two or more bits. A portion of the second field F2 may indicate the type (e.g., the XR device 200) of the transmitting-side device, and the rest of the second field F2 may indicate the type (e.g., the mobile terminal 300) of the receiving-side device. To that end, in an embodiment, the transmitting-side device may configure a portion of the second field F2 as a code indicating the type of the transmitting-side device, and configure a remaining portion of the second field F2 as a code indicating the type of the receiving-side device to receive the optical signal S. In other words, in an embodiment, the transmitting-side device may generate an optical signal S to have a code indicating both the type of the transmitting-side device and the type of the receiving-side device to receive the optical signal S.

In an embodiment, when the second field F2 is set to 'XY,' 'X' may indicate the type of the transmitting-side device, and 'Y' may indicate the type of the receiving-side device. For example, if the second field F2 is configured as '01' as a case where 0 indicates the mobile terminal 300, and 1 indicates the XR device 200, the receiving-side device receiving the optical signal S may identify the transmission/reception entity of the received optical signal S with the optical signal S that the mobile terminal 300 outputs targeting the XR device 200. For example, if the second field F2 is configured as '10' as a case where 0 indicates the mobile terminal 300, and 1 indicates the XR device 200, the receiving-side device receiving the optical signal S may identify the transmission/reception entity of the received optical signal S with the optical signal S that the XR device 200 outputs targeting the mobile terminal 300.

In an embodiment, the third field F3 may indicate service information. In an embodiment, the service information may indicate various services (e.g., user registration, device connection, unlock, or electronic payment) that may be provided using the optical signal S. Each service may be associated with a different code. For example, when the third field F3 is constitutes three bits, '000' may indicate user registration, '001' user connection, '100' unlock, and '101' electronic payment.

In an embodiment, the mobile terminal 300 may identify the type of the service to be provided using the optical signal S transmitted by the XR device 200 based on the code constituting the third field F3.

In an embodiment, when the third field F3 is encoded to indicate user registration, the mobile terminal 300 may perform one or more operations for user registration. For example, the mobile terminal 300 may transmit user information to the XR device 200. In this case, the mobile terminal 300 may output the optical signal S in which the user information is encoded in the fourth field F4.

In an embodiment, the XR device 200 which provides the optical signal S, in which the user registration is encoded in the third field F3, to the mobile terminal 300 may read the user information provided from the mobile terminal 300 and store it in the memory. In other words, the XR device 200 may store the user information encoded in the fourth field F4 in the memory.

In an embodiment, when the third field F3 is encoded to indicate device connection, the mobile terminal 300 may perform one or more operations for device connection. For example, the mobile terminal 300 may transmit user information to the XR device 200. In this case, the mobile terminal 300 may output the optical signal S in which the user information is encoded in the fourth field F4.

In an embodiment, the XR device 200 which provides the optical signal S, in which the device connection is encoded in the third field F3, to the mobile terminal 300 may compare the user information provided from the mobile terminal 300 with the user information previously stored in the memory. In an embodiment, the XR device 200 may request the mobile terminal 300 to secure connectivity based on the comparison result. For example, when the previously stored user information differs from the provided user information, the XR device 200 may not request to secure connectivity between the devices. For example, when the previously stored user information substantially matches the provided user information, the XR device 200 may request to secure connectivity between the devices. Here, securing connectivity may be understood as wirelessly pairing between two devices. The wireless pairing may be performed by the communication units (e.g., the communication units 210 and 310 of FIG. 3) of the XR device 200 and the mobile terminal 300. The XR device 200 according to an embodiment of the disclosure may identify whether the user is a registered user based on the user information encoded in the optical signal S and, if a registered user, perform wireless pairing through the communication unit. The user information is described below with reference to the description of the fourth field F4.

In an embodiment, when the third field F3 is encoded to indicate unlocking, the mobile terminal 300 may perform one or more operations for unlocking. For example, the mobile terminal 300 may switch the user interface screen indicating the lock screen to a user interface screen indicating another screen in response to identifying the code indicating unlocking from the third field F3. The other screen may include, e.g., an execution screen of an application (e.g., the application 146 of FIG. 1) running in advance or the home screen, but is not limited thereto.

In an embodiment, when the third field F3 is encoded to indicate electronic payment, the mobile terminal 300 may perform one or more operations for electronic payment.

According to an embodiment, the mobile terminal 300 may invoke an application for electronic payment in response to identifying the code indicating electronic payment from the third field F3 or transmit an electronic payment request to the network simultaneously with (or immediately after) executing the application for electronic payment.

In an example, the network receiving the electronic payment request may include an electronic payment system. The electronic payment system may include a payment server. The mobile terminal 300 may include, e.g., a payment application (or wallet application).

In an example, the payment application may include the Samsung Pay application (Samsung Pay™). The payment application may provide, e.g., a user interface (e.g., user interface (UI) or user experience (UX)) related to payment. The payment application may provide, e.g., a user interface related to card registration, payment, or transaction. The payment application may provide an interface related to card registration through, e.g., a character reader (e.g., optical character reader/recognition (OCR)) or an external input (e.g., user input). Further, the payment application may provide an interface related to user authentication through, e.g., identification and verification (ID&V).

Further, the payment application may perform payment transactions. For example, the payment application may provide a payment function to the user through execution of a designated application. According to an embodiment, the payment application may perform the payment function based on one or more simple gestures or communication (e.g., near-field communication (NFC) or Bluetooth™ (BT)) with a peripheral device.

In one example, the payment server may include a management server for electronic payment or mobile payment. The payment server may receive, e.g., information related to payment from the mobile terminal 300 and transmit the received payment-related information to the outside or process it on the payment server. In an example, the payment application included in the mobile terminal 300 and the payment server may be functionally connected to each other. The payment application may transmit/receive the payment-related information to/from the payment server.

According to an embodiment, the mobile terminal 300 may execute the application for electronic payment based on a user input. While the mobile terminal 300 is executing the electronic payment application, the mobile terminal 300 may receive an optical signal S encoded with a code indicating electronic payment from the XR device 200. The mobile terminal 300 may transmit an electronic payment request to the network through the running application for electronic payment, based on identifying the code indicating electronic payment. In other words, upon identifying the code indicating electronic payment, the mobile terminal 300 may determine that user authentication for transmission of the electronic payment request has been performed, and transmit an electronic payment request to the network based on the user authentication.

In an embodiment, the fourth field F4 may indicate user information. Here, the user information is information for identifying the user of the mobile terminal 300. The user information of the mobile terminal 300 may be stored in the memory (e.g., the memory unit 230 of FIGS. 3 and 4) of the XR device 200. The user information may be represented as, e.g., binary code with at least two bits, at least four bits, or at least six bits, but is not limited thereto. For example, '000000' may indicate USER1, and '111111' may indicate USER2. Accordingly, the XR device 200 may register or identify the user information and represent the user interface screen preferred by each user on the display (e.g., the display GD of FIG. 13) based on the user information.

In an embodiment, the fifth field F5 may indicate transmission complete. The fifth field F5 may be configured to have two or more bits. The receiving-side device and transmitting-side device may encode the code indicating transmission complete in the fifth field F5 of the optical signal S. In an embodiment, the code indicating transmission complete may be represented in a manner to reverse the front and rear of the code of the second field F2. For example, when the second field F2 is encoded as '01,' the fifth field F5 may be encoded as '10.' The transmitting/receiving-side device may reduce current consumption while transmitting/receiving the optical signal S by applying the code indicating transmission complete.

Figure 8:
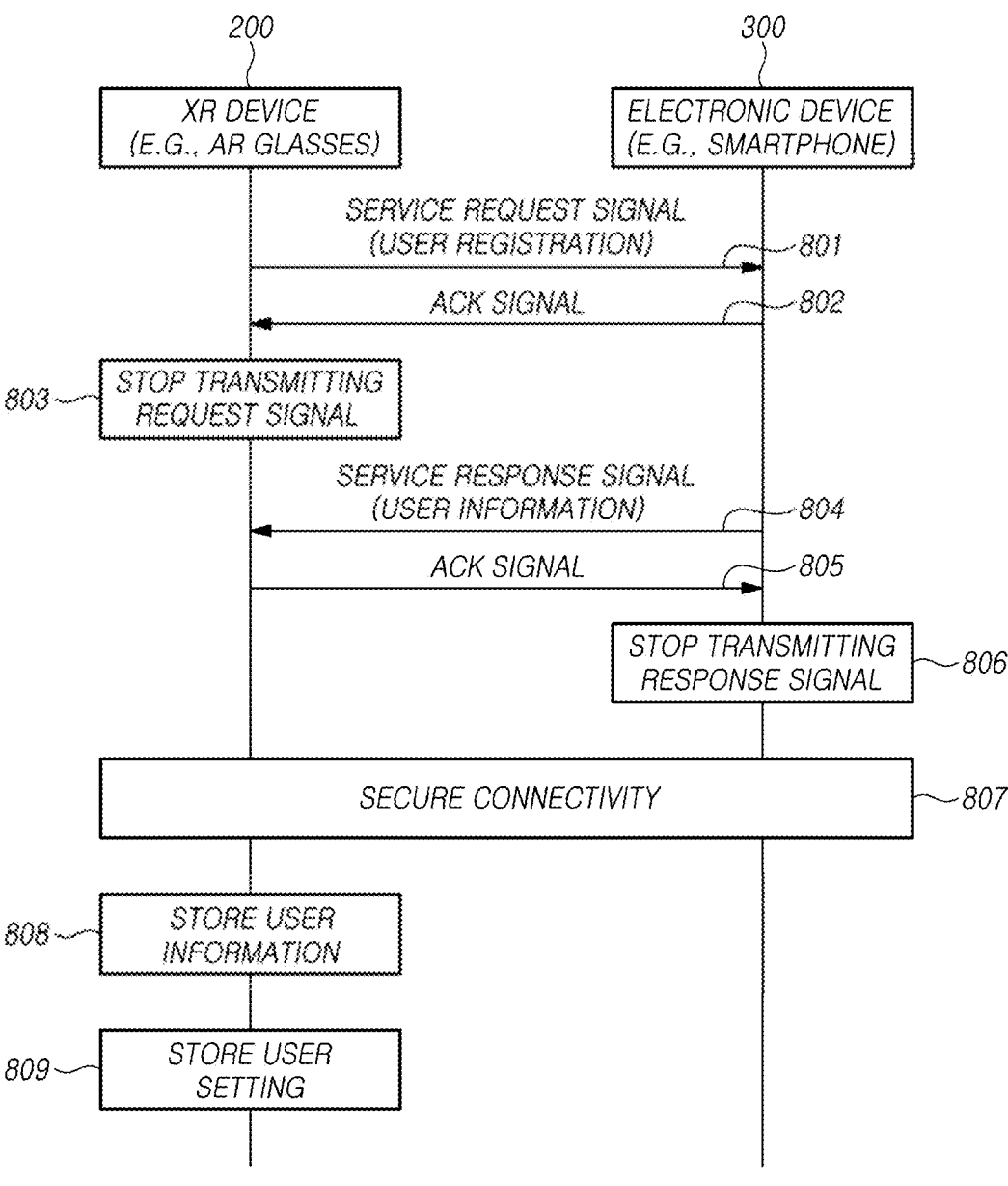
FIG. 8 illustrates a control method of a user registration process according to an embodiment.

FIG. 8 illustrates a control method of a user registration process according to an embodiment.

In the following embodiment, the operations may be sequentially performed, but may be performed non-sequentially. For example, the order of the operations may be changed, and at least two operations may be performed in parallel.

In an embodiment, 801 to 809 may be understood as performed by the controller (e.g., the first processor 220 or second processor 320 of FIG. 5) of the XR device 200 or the electronic device 300.

Referring to FIG. 8, in an embodiment, the XR device 200 may output a service request signal to the electronic device 300 (801). In an embodiment, the third field of the service request signal may be encoded for user registration. In an embodiment, the service request signal may be an optical signal in which the third field is encoded for user registration. In an embodiment, the service request signal may be periodically output, but is not limited thereby.

In an embodiment, the electronic device 300 may transmit an ACK signal to the XR device 200 based on detecting the service request signal (802). In an embodiment, the ACK signal may be an optical signal in which the first field is encoded to indicate an ACK.

In an embodiment, the XR device 200 may stop outputting the service request signal in response to detecting the ACK signal (803). In an embodiment, the XR device 200 may repeatedly output the service request signal at designated times until before the ACK signal is detected. In an embodiment, the XR device 200 may stop outputting the service request signal repeatedly output at the designated times in response to detecting the ACK signal.

In an embodiment, the electronic device 300 may output a service response signal based on detecting the service request signal (804). In an embodiment, the service response signal may be an optical signal in which the user information is encoded in the fourth field. In an embodiment, the electronic device 300 may output an optical signal in which the user information is encoded, separately after outputting an ACK signal based on detecting the service request signal. In an embodiment, the electronic device 300 may output an optical signal S in which the user information is encoded, separately in parallel with outputting an ACK signal based on detecting the service request signal. In an embodiment, the electronic device 300 may output one optical signal in which the first field is encoded with an ACK, and the fourth field is encoded with the user information. Upon outputting the optical signal in which the first field and the fourth field are encoded with the ACK and the user information, respectively, operation 802 of outputting the ACK signal as described above may be omitted.

In an embodiment, the XR device 200 may transmit an ACK signal to the electronic device 300 based on detecting the service response signal (805). In an embodiment, the ACK signal may be an optical signal in which the first field is encoded to indicate an ACK.

In an embodiment, the electronic device 300 may stop outputting the service response signal in response to detecting the ACK signal (806). In an embodiment, the electronic device 300 may repeatedly output the service response signal at designated times until before the ACK signal is detected. In an embodiment, the electronic device 300 may stop outputting the service response signal repeatedly output at the designated times in response to detecting the ACK signal.

In an embodiment, the XR device 200 and the electronic device 300 may secure connectivity (807). In an embodiment, the XR device 200 and the electronic device 300 may be wirelessly connected through their respective communication units (e.g., the communication units 210 and 310 of FIG. 3). In an embodiment, the XR device 200 may transmit a request for wireless connection with the electronic device 300 through the communication unit, based on detecting the service response signal. In an embodiment, when the third field is encoded as user registration and output, the XR device 200 may request wireless connection based on receiving the service response signal from the electronic device 300. For example, when the XR device 200 encodes the third field as user registration and transmits an optical signal (service request signal), the XR device 200 may send a request for wireless connection to the electronic device 300 without comparing the user information stored in the memory (e.g., the memory unit 230 of FIGS. 3 and 4) with the user information encoded in the service response signal.

In an embodiment, the XR device 200 may store the user information provided from the electronic device 300 in the memory (808). In an embodiment, the XR device 200 may store the user information encoded in the fourth field of the service response signal in the memory.

In an embodiment, the XR device 200 may store a user setting configured while the connectivity remains secured in the memory (809). In an embodiment, the XR device 200 may store the user setting based on the user input to the XR device 200 while the connectivity with the electronic device 300 remains secured, i.e., while the wireless connection is maintained, in the memory. The XR device 200 may associate the user information provided from the electronic device 300 in wireless connection with the stored user setting. For example, the XR device 200 may map the user information provided from the electronic device 300 in wireless connection with the user setting stored in the memory. For example, the XR device 200 may couple the user information provided from the electronic device 300 in wireless connection with the user setting stored in the memory. The coupled or mapped user setting may be identified based on the user information. For example, a first user setting associated with a first user may be loaded based on the user information indicating the first user, and a second user setting associated with a second user may be loaded based on the user information indicating the second user. By the user setting configured to be associated with the user, the user may easily load and apply the preset user setting even without reconfiguring a user setting whenever using the XR device 200.

Meanwhile, the service request signal, service response signal, and ACK signal described in connection with FIG. 8 may be optical signals (e.g., the optical signal S of FIG. 7), and each optical signal may be output or detected through the optical sensor (e.g., the optical sensor 240*b* or 340*b* of FIG. 5) provided in each device.

Figure 9:
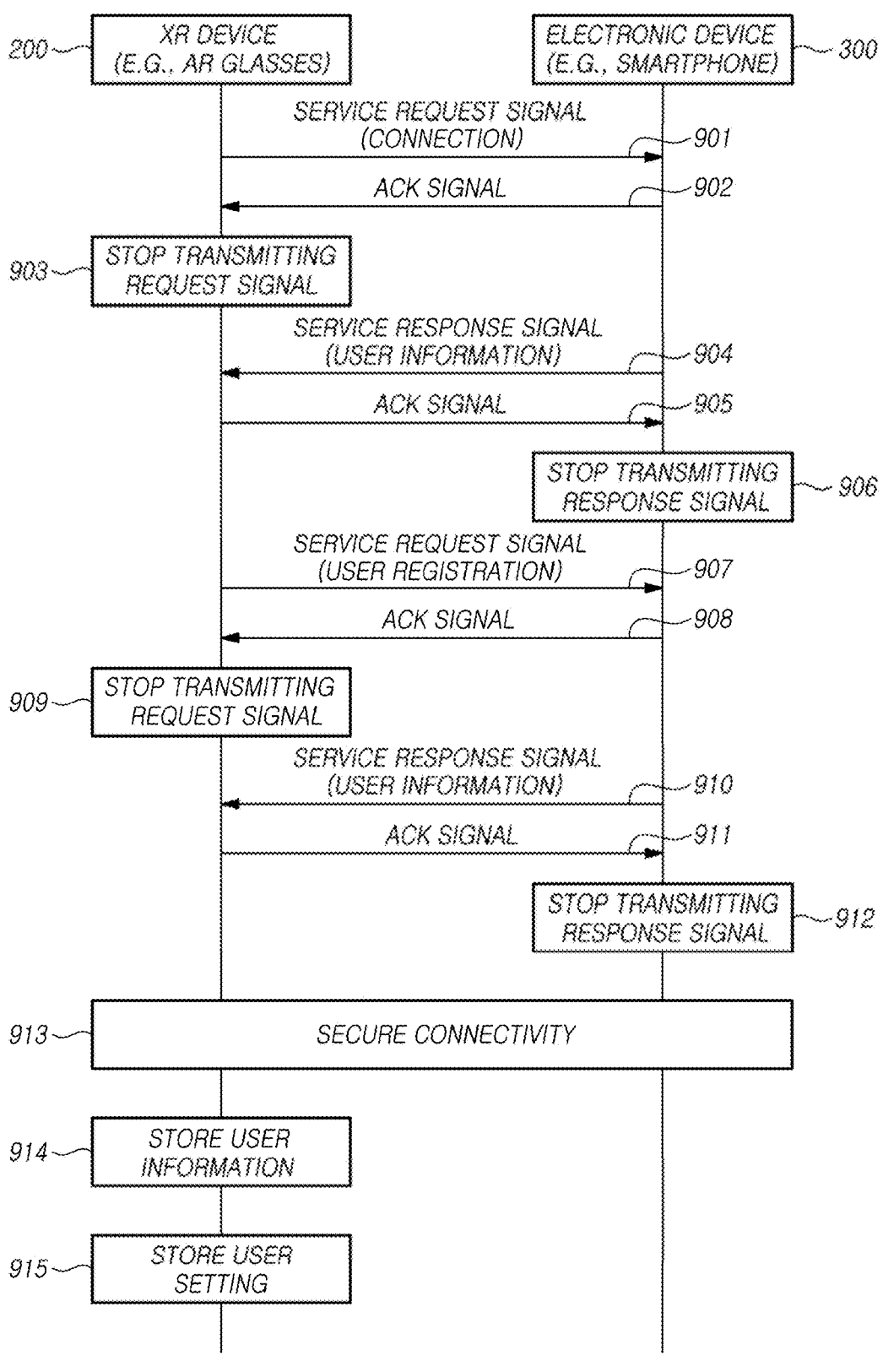
FIG. 9 illustrates a control method of a user registration process according to an embodiment.

FIG. 9 illustrates a control method of a user registration process according to an embodiment.

In the following embodiment, the operations may be sequentially performed, but may be performed non-sequentially. For example, the order of the operations may be changed, and at least two operations may be performed in parallel.

In an embodiment, 901 to 915 may be understood as performed by the controller (e.g., the first processor 220 or second processor 320 of FIG. 5) of the XR device 200 or the electronic device 300.

Referring to FIG. 9, in an embodiment, the XR device 200 may output a service request signal to the electronic device 300 (901). In an embodiment, the third field of the service request signal may be encoded for device connection. In an embodiment, the service request signal may be an optical signal in which the third field is encoded for device connection. In an embodiment, the service request signal may be periodically output, but is not limited thereby.

In an embodiment, the electronic device 300 may output an ACK signal based on detecting the service request signal (902). In an embodiment, the ACK signal may be an optical signal in which the first field is encoded to indicate an ACK.

In an embodiment, the XR device 200 may stop outputting the service request signal in response to detecting the ACK signal (903). In an embodiment, the XR device 200 may repeatedly output the service request signal at designated times until before the ACK signal is detected. In an embodiment, the XR device 200 may stop outputting the service request signal repeatedly output at the designated times in response to detecting the ACK signal.

In an embodiment, the electronic device 300 may output a service response signal based on detecting the service request signal (904). In an embodiment, the service response signal may be an optical signal in which the user information is encoded in the fourth field. In an embodiment, the electronic device 300 may output an optical signal in which the user information is encoded, separately after outputting an ACK signal based on detecting the service request signal. In an embodiment, the electronic device 300 may output an optical signal S in which the user information is encoded, separately in parallel with outputting an ACK signal based on detecting the service request signal. In an embodiment, the electronic device 300 may output one optical signal in which the first field is encoded with an ACK, and the fourth field is encoded with the user information. Upon outputting the optical signal in which the first field and the fourth field are encoded with the ACK and user information, respectively, operation 902 of outputting the ACK signal described above may be omitted and, in this case, operation 903 may be performed based on detecting the signal according to operation 904.

In an embodiment, the XR device 200 may output an ACK signal based on detecting the service response signal (905). In an embodiment, the ACK signal may be an optical signal in which the first field is encoded to indicate an ACK.

In an embodiment, the electronic device 300 may stop outputting the service response signal in response to detecting the ACK signal (906). In an embodiment, the electronic device 300 may repeatedly output the service response signal at designated times until before the ACK signal is detected. In an embodiment, the electronic device 300 may stop outputting the service response signal repeatedly output at the designated times in response to detecting the ACK signal.

In an embodiment, the XR device 200 may re-transmit a service request signal to the electronic device 300 (907).

In an embodiment, the XR device 200 may determine whether to output the service request signal regarding user registration based on the user information encoded in the fourth field of the service response signal. For example, the XR device 200 may compare the user information encoded in the fourth field of the service response signal with the user information previously stored in the memory (e.g., the memory unit 230 of FIGS. 3 and 4).

Figure 10:
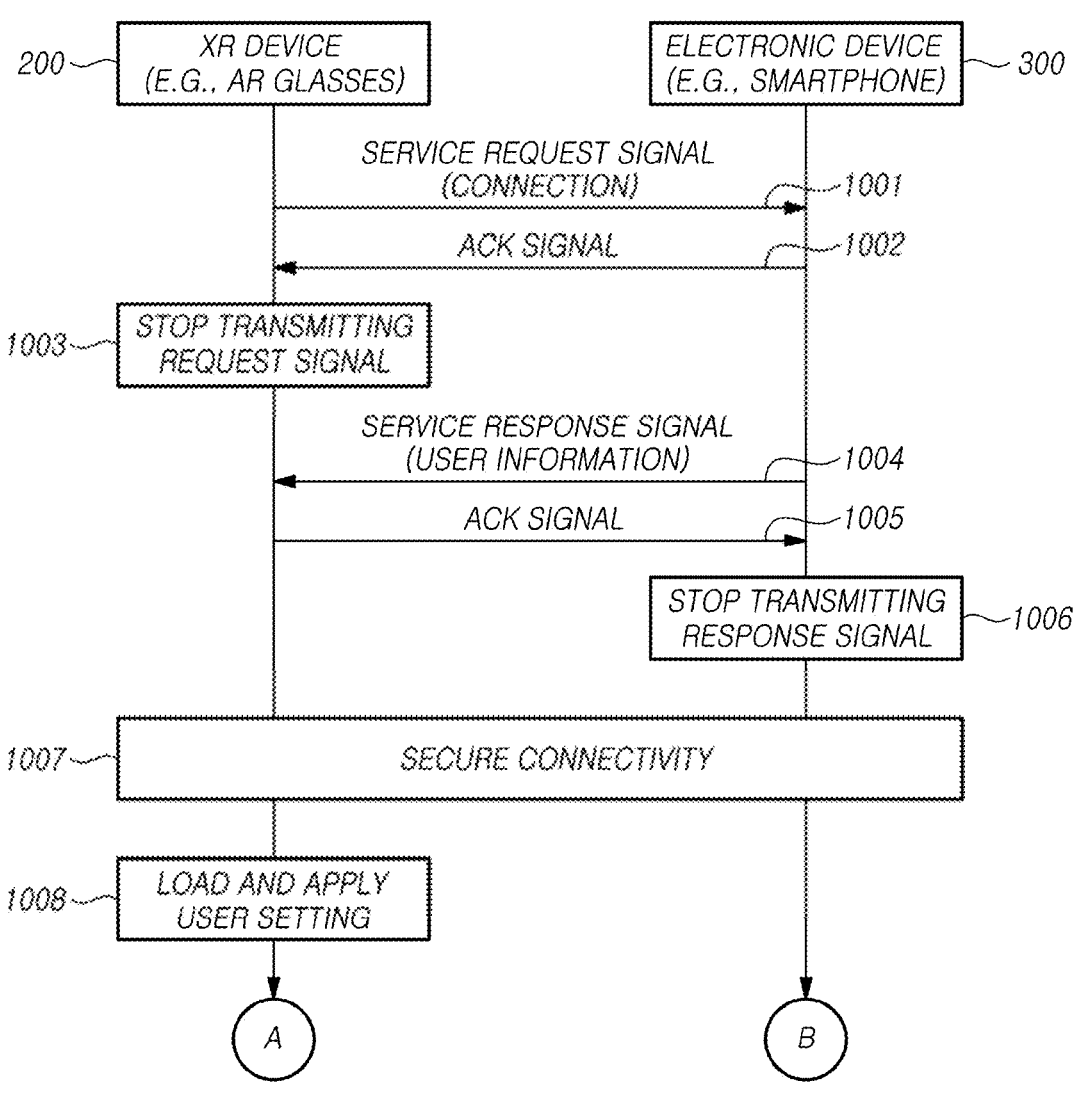
FIG. 10 illustrates an example of a control method of wireless connection according to an embodiment.

For example, when the user information included in the service response signal matches the user information previously stored, the XR device 200 may transmit a wireless connection request for securing connectivity to the electronic device 300 (refer to 807 of FIG. 8 or 1007 of FIG. 10). Specifically, when the user information included in the service response signal matches the user information previously stored in the memory, the XR device 200 and the electronic device 300 may omit operations 907 to 912 for registering new user information, and the XR device 200 may perform an operation (refer to 807 of FIG. 8 or 1007 of FIG. 10) for securing connectivity.

For example, when the user information included in the service response signal does not matches the user information previously stored, the XR device 200 may generate a new service request signal in which user registration is encoded in the third field. In an embodiment, the XR device 200 may transmit the new service request signal to the electronic device 300, obtaining new user information from the electronic device 300 (refer to 802 to 807 of FIG. 8 or 908 to 915 of FIG. 9).

Specifically, in an embodiment, the electronic device 300 may output an ACK signal based on detecting the service request signal related to user registration (908). In an embodiment, the XR device 200 may stop outputting the service request signal related to user registration in response to detecting the ACK signal (909). In an embodiment, the electronic device 300 may output a service response signal including new user information based on detecting the service request signal related to user registration (910). In an embodiment, the XR device 200 may output an ACK signal based on detecting the service response signal (911). In an embodiment, the electronic device 300 may stop outputting the service response signal in response to detecting the ACK signal (912).

Here, 908 to 915 may correspond to 802 to 809 of FIG. 8. Meanwhile, the service request signal, service response signal, and ACK signal described in connection with FIG. 9 may be optical signals (e.g., the optical signal S of FIG. 7), and each optical signal may be output or detected through the optical sensor (e.g., the optical sensor 240*b* or 340*b* of FIG. 5) provided in each device.

In an embodiment, 901 to 915 may be understood as performed by the controller (e.g., the first processor 220 or second processor 320 of FIG. 5) of the XR device 200 or the electronic device 300.

FIG. 10 illustrates an example of a method of wireless connection between an XR device and an electronic device according to an embodiment.

In the following embodiment, the operations may be sequentially performed, but may be performed non-sequentially. For example, the order of the operations may be changed, and at least two operations may be performed in parallel.

Referring to FIG. 10, in an embodiment, the XR device 200 may output a service request signal associated with device connection to the electronic device 300 (1001). In an embodiment, the electronic device 300 may output an ACK signal based on detecting the service request signal associated with device connection (1002). In an embodiment, the XR device 200 may stop outputting the service request signal associated with device connection in response to detecting the ACK signal (1003). In an embodiment, the electronic device 300 may output a service response signal including user information based on detecting the service request signal associated with device connection (1004). In an embodiment, the XR device 200 may output an ACK signal based on detecting the service response signal (1005). In an embodiment, the electronic device 300 may stop outputting the service response signal in response to detecting the ACK signal (1006). Here, 1001 to 1006 may correspond to 901 to 906.

In an embodiment, the XR device 200 and the electronic device 300 may secure connectivity (1007). In an embodiment, the XR device 200 and the electronic device 300 may be wirelessly connected through their respective communication units (e.g., the communication units 210 and 310 of FIG. 3). In an embodiment, the XR device 200 may transmit a request for wireless connection with the electronic device 300 through the communication unit (e.g., the communication unit of FIGS. 3 and 4), based on detecting the service response signal.

In an embodiment, when the third field is encoded as device connection and output, the XR device 200 may request wireless connection based on receiving the service response signal from the electronic device 300. For example, when the XR device 200 encodes the third field as user registration and transmits an optical signal (service request signal), the XR device 200 may send a request for wireless connection with the electronic device 300 through the communication unit without comparing the user information stored in the memory (e.g., the memory unit 230 of FIGS. 3 and 4) with the user information encoded in the service response signal.

In an embodiment, the XR device 200 and the electronic device 300 may secure connectivity (1007). In an embodiment, the XR device 200 may compare the user information encoded in the fourth field of the service response signal with the user information previously stored in the memory, determining a subsequent operation (e.g., either a service request regarding user registration or a request for wireless connection with the electronic device 300). In an embodiment, the XR device 200 may determine whether to output the service request signal regarding user registration based on the user information encoded in the fourth field of the service response signal (refer to 907 of FIG. 9). In an embodiment, the XR device 200 may determine whether transmit a wireless connection request to the electronic device 300 based on the user information encoded in the fourth field of the service response signal.

In an embodiment, the XR device 200 may compare the user information encoded in the fourth field of the service response signal with the user information previously stored in the memory. In an embodiment, when the user information included in the service response signal matches the user information previously stored, the XR device 200 may transmit a wireless connection request for securing connectivity to the electronic device 300 through the communication unit.

In an embodiment, when the user information included in the service response signal does not matches the user information previously stored, the XR device 200 may generate a new service request signal in which user registration is encoded in the third field (refer to 907 of FIG. 9).

In an embodiment, the XR device 200 may transmit the new service request signal to the electronic device 300, obtaining new user information from the electronic device 300.

Referring back to 1007 of FIG. 10, the XR device 200 and the electronic device 300 may be wirelessly connected through their respective communication units (e.g., the communication units 210 and 310 of FIG. 3). In an embodiment, the XR device 200 may transmit a request for wireless connection with the electronic device 300 through the communication unit (e.g., the communication unit 210 of FIG. 3), based on detecting the service response signal through the optical sensor (e.g., 240b of FIG. 5). In an embodiment, the XR device 200 may transmit a request for wireless connection with the electronic device 300 to the electronic device 300 through the communication unit (e.g., the communication unit 210 of FIGS. 3 and 4) based on determining that the user information included in the user response signal substantially matches the user information previously stored in the memory (e.g., the memory unit 230 of FIGS. 3 and 4).

In an embodiment, upon determining that the user information included in the user response signal substantially matches the user information previously stored in the memory, the XR device 200 may load a previously stored user setting based on the user information included in the user response signal. In an embodiment, the XR device 200 may display a preset user interface screen on the display (e.g., the display GD of FIG. 13) based on the loaded user setting.

Meanwhile, the service request signal, service response signal, and ACK signal described in connection with FIG. 10 may be optical signals (e.g., the optical signal S of FIG. 7), and each optical signal may be output or detected through the optical sensor (e.g., the optical sensor 240b or 340b of FIG. 5) provided in each device.

Figure 11:
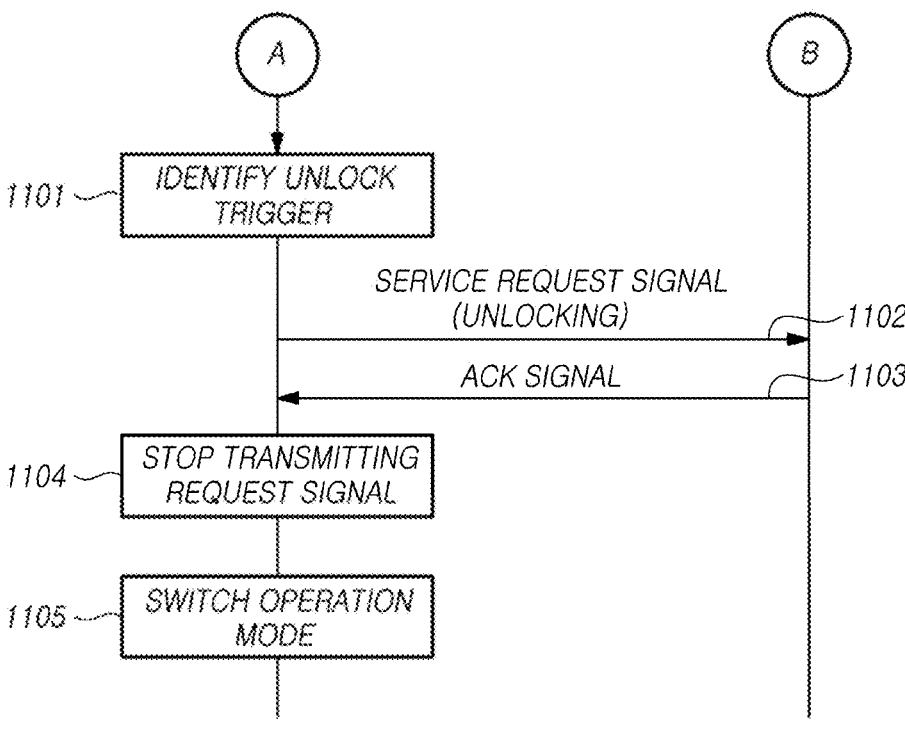
FIG. 11 illustrates an example of a control method of an unlock process of a UE according to an embodiment.

FIG. 11 illustrates a control method of an unlock process of a UE according to an embodiment.

In the following embodiment, the operations may be sequentially performed, but may be performed non-sequentially. For example, the order of the operations may be changed, and at least two operations may be performed in parallel.

In an embodiment, 1101 to 1105 may be understood as performed by the controller (e.g., the first processor 220 or second processor 320 of FIG. 5) of the XR device 200 or the electronic device 300.

Referring to FIG. 11, in an embodiment, the following operations may be performed while the connectivity between the XR device 200 and the electronic device 300 remains secured.

In an embodiment, the XR device 200 may identify an unlock trigger (1101).

In an embodiment, the unlock trigger may be identified based on a gesture of the XR device 200. For example, the unlock trigger may be identified based on the XR device 200 tilting at a predetermined angle. In an embodiment, the XR device 200 may include a tilt sensor (e.g., gyro sensor) and may obtain tilting information (e.g., tilting state and tilting angle) about the XR device 200 through the tilt sensor. In an embodiment, upon determining that the device is tilted at the predetermined angle or more, the XR device 200 may determine that the unlock trigger is identified.

In an embodiment, the unlock trigger may be identified based on the user's gaze. For example, the unlock trigger may be identified based on the user gazing at another electronic device 300. In an embodiment, the XR device 200 may obtain gaze information (e.g., gaze direction) using a gaze sensor (e.g., an image sensor provided to be directed to the user's eyes). In an embodiment, upon determining that the user gazes at another electronic device 300 based on the gaze direction, the XR device 200 may determine that the unlock trigger is identified.

In an embodiment, the unlock trigger may also be identified based on a preset user input. For example, the XR device 200 may determine that the unlock trigger is identified, based on a user input to the XR device 200. The user input includes the user's physical input to the input unit (e.g., the input module 150 or the display module 160 of FIG. 1) provided in the XR device 200, but is not limited thereto.

Meanwhile, embodiments of the disclosure are not limited to the above-described implementation examples, and in an embodiment, the XR device 200 may perform operation 1102 and the subsequent operations regardless of the unlock trigger.

In an embodiment, the XR device 200 may output a service request signal related to unlocking to the electronic device 300 based on identifying the unlock trigger (1102). In an embodiment, the service request signal may be an optical signal in which the third field is encoded to indicate unlocking.

In an embodiment, the electronic device 300 may output an ACK signal to the XR device 200 based on detecting the unlocking-related service request signal (1103). In an embodiment, the ACK signal may be an optical signal in which the first field is encoded to indicate an ACK.

In an embodiment, the XR device 200 may stop outputting the service request signal related to unlocking in response to detecting the ACK signal (1104). In an embodiment, the XR device 200 may repeatedly output the unlocking-related service request signal at designated times until before the ACK signal is detected. In an embodiment, the XR device 200 may stop outputting the unlocking-related service request signal repeatedly output at the designated times in response to detecting the ACK signal.

In an embodiment, the XR device 200 may switch the operation mode of the display (e.g., the display GD of FIG. 13) (1105).

For example, upon identifying an unlocking-related trigger, the XR device 200 may switch the operation mode of the display. For example, the XR device 200 may switch the operation mode of the display based on outputting an unlocking-related service request signal. For example, the XR device 200 may switch the operation mode of the display based on detecting an ACK signal for the unlocking-related service request signal after outputting the service request signal.

In an embodiment, the XR device 200 may switch the operation mode of the display from the normal mode to the mobile use mode. In the disclosure, the operation mode of the display means the display state of the user interface screen displayed on the display of the XR device 200.

In an embodiment, the XR device 200 may display the entire user interface screen, loaded based on the user setting while running in the normal mode, on the display.

In an embodiment, the XR device 200 may control not to display the user interface screen on the display while running in the mobile use mode. For example, while running in the mobile use mode, the XR device 200 may serve as typical glasses or goggles.

In an embodiment, the XR device 200 may control to deactivate at least some of the graphic user interface (GUI) elements constituting the user interface screen on the display while running in the mobile use mode. For example, the XR device 200 may configure the user interface screen not to display GUI elements positioned in the portion overlapping the display screen of the electronic device 300.

Meanwhile, the service request signal and ACK signal described in connection with FIG. 11 may be optical signals, and each optical signal may be output or detected through the optical sensor provided in each device.

Figure 12:
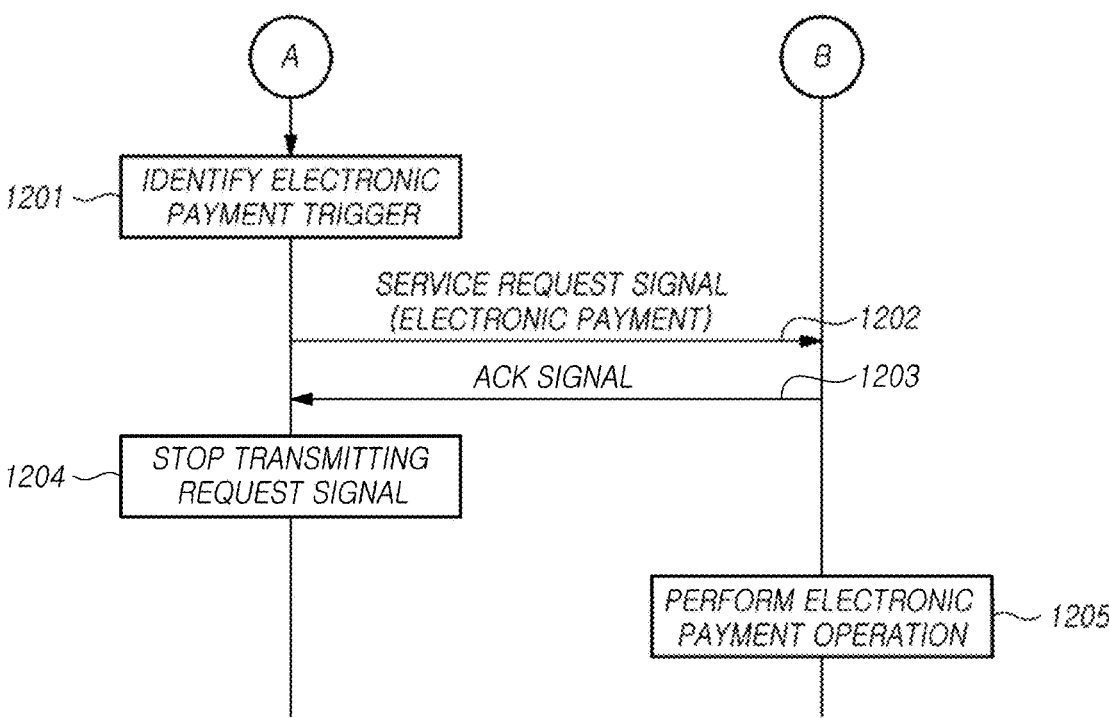
FIG. 12 illustrates an example of a control method of an electronic payment process according to an embodiment.

FIG. 12 illustrates an example of a control method of an electronic payment process according to an embodiment.

In the following embodiment, the operations may be sequentially performed, but may be performed non-sequentially. For example, the order of the operations may be changed, and at least two operations may be performed in parallel.

In an embodiment, 1201 to 1205 may be understood as performed by the controller (e.g., the first processor 220 or second processor 320 of FIG. 5) of the XR device 200 or the electronic device 300.

Referring to FIG. 12, in an embodiment, the following operations may be performed while the connectivity between the XR device 200 and the electronic device 300 remains secured.

In an embodiment, the XR device 200 may identify an electronic payment trigger (1201).

In an embodiment, the electronic payment trigger may be identified based on the positional state and/or tilting state of the XR device 200. For example, the electronic payment trigger may be identified based on the XR device 200 tilting at a predetermined angle. In an embodiment, the XR device 200 may include a tilt sensor (e.g., gyro sensor) and may obtain tilting information (e.g., tilting state and tilting angle) about the XR device 200 through the tilt sensor. In an embodiment, upon determining that the device is tilted at the predetermined angle or more, the XR device 200 may determine that the electronic payment trigger is identified.

In an embodiment, the electronic payment trigger may be identified based on the user's gaze. For example, the electronic payment trigger may be identified based on the user gazing at another electronic device 300. In an embodiment, the XR device 200 may obtain gaze information (e.g., gaze direction) using a gaze sensor (e.g., an image sensor provided to be directed to the user's eyes). In an embodiment, upon determining that the user gazes at another electronic device 300 based on the gaze direction (that is, the direction in which the user is gazing), the XR device 200 may determine that the electronic payment trigger is identified.

In an embodiment, the electronic payment trigger may also be identified based on a preset user input. For example, the XR device 200 may determine that the electronic payment trigger is identified, based on a user input to the XR device 200 (e.g., an input to press the input unit provided on an area of one or more surfaces).

In an embodiment, the electronic payment trigger may be identified based on receiving a trigger request from the wirelessly connected electronic device 300. The electronic device 300 may transmit a trigger request to the XR device 200 through the communication unit (e.g., the communication unit 310 of FIG. 3). The XR device 200 may determine that the electronic payment trigger is identified in response to receiving the trigger request.

In an embodiment, the trigger request may be generated by the payment application of the electronic device 300. In an embodiment, the trigger request may be generated by the payment application based on failure in biometric authentication for electronic payment.

Specifically, the electronic device 300 may generate purchase information regarding the product(s) to be purchased. The purchase information may include information regarding the product(s) determined to be purchased and the price of the product(s). The purchase information may be generated, e.g., by a user input(s) to the electronic device 300 and/or the XR device 200. Specifically, the user may select the product(s) to purchase using the electronic device 300 and, after selection, enter an input to determine purchase to the electronic device 300. As such, the electronic device 300 may generate purchase information based on such user inputs (e.g., an input to select a product or an input to determine purchase). Meanwhile, the XR device 200 may also generate purchase information based on user inputs. The XR device 200 may transmit the generated purchase information to the electronic device 300 for electronic payment, but is not limited thereto. Generation of purchase information by the XR device 200 is described below with reference to FIG. 17.

In an example, the purchase information may be transmitted to the seller server by the electronic device 300 based on the completion of a series of electronic payment processes. The series of electronic payment processes may include a biometric authentication operation and an electronic payment request transmission operation by the electronic device 300. The biometric authentication (or user recognition) may include, e.g., fingerprint recognition or voice recognition. The biometric authentication may be performed by comparing the user's biometric information (e.g., fingerprint information or voice information) stored in the memory (e.g., the memory unit 330 of FIG. 3) with the sensing information (e.g., fingerprint sensing information or voice characteristic information) obtained through a sensor.

In an embodiment, the trigger request may be transmitted to the XR device 200 based on failure in biometric authentication by the electronic device 300. In an example, when the user's biometric information previously stored in the memory (e.g., the memory unit 330 of FIG. 3) of the electronic device 300 substantially matches the sensing information obtained through the sensor, the electronic device 300 may determine that biometric authentication succeeds and, if not matching, determine that the biometric authentication fails. In an embodiment, upon determining that biometric authentication succeeds, the electronic device 300 may transmit an electronic payment request to the network (e.g., payment server) and, upon determining that biometric authentication fails, generate a trigger request. The electronic device 300 may transmit the generated trigger request to the XR device 200. As such, the XR device 200, receiving the trigger request from the electronic device 300, may identify the electronic payment trigger. Meanwhile, upon determining that biometric authentication succeeds, the electronic device 300 may transmit the electronic payment request to the network while omitting operations 1201 to 1205 of FIG. 12, completing the electronic payment process.

Meanwhile, embodiments of the disclosure are not limited to the above-described implementation examples, and in an embodiment, the XR device 200 may perform operation 1202 and the subsequent operations regardless of the electronic payment trigger.

In an embodiment, the XR device 200 may output a service request signal related to electronic payment to the electronic device 300 based on identifying the electronic payment trigger (1202). In an embodiment, the service request signal may be an optical signal in which the third field is encoded to indicate electronic payment.

In an embodiment, the electronic device 300 may output an ACK signal to the XR device 200 based on detecting the electronic payment-related service request signal (1203). In an embodiment, the ACK signal may be an optical signal in which the first field is encoded to indicate an ACK.

In an embodiment, the XR device 200 may stop outputting the service request signal related to electronic payment in response to detecting the ACK signal (1204). In an embodiment, the XR device 200 may repeatedly output the electronic payment-related service request signal at designated times until before the ACK signal is detected. In an embodiment, the XR device 200 may stop outputting the electronic payment-related service request signal repeatedly output at the designated times in response to detecting the ACK signal.

In an embodiment, the electronic device 300 may transmit an electronic payment request to the network (1205). For example, the memory (e.g., the memory unit 330 of FIGS. 3 and 4) of the electronic device 300 may store the payment application. The electronic device 300 may generate an electronic payment request using the payment application stored in the memory. Meanwhile, the electronic device 300 may transmit information regarding a card registered in the payment application to the network for electronic payment using the card.

Meanwhile, as described above, it may be determined based on the result of body unit 310 whether to transmit the electronic payment request. For example, if it is determined that biometric authentication succeeds as a result of biometric authentication, the electronic device 300 may transmit the electronic payment request to the network. For example, upon determining that biometric authentication fails as a result of biometric authentication, the electronic device 300 may not transmit the electronic payment request to the network. However, upon detecting a service request signal regarding electronic payment, the electronic device 300 may transmit the electronic payment request to the network regardless of the biometric authentication result.

Although not limited thereto, the electronic device 300 may display an execution screen indicating payment complete on the display (e.g., the display MD of FIG. 14) or transmit a message guiding payment complete to the XR device 200 after transmitting the electronic payment request to the network (e.g., payment server).

Meanwhile, the service request signal and ACK signal described in connection with FIG. 12 may be optical signals (e.g., the optical signal S of FIG. 7), and each optical signal may be output or detected through the optical sensor (e.g., the optical sensor 240b or 340b of FIG. 5) provided in each device.

Figure 13:
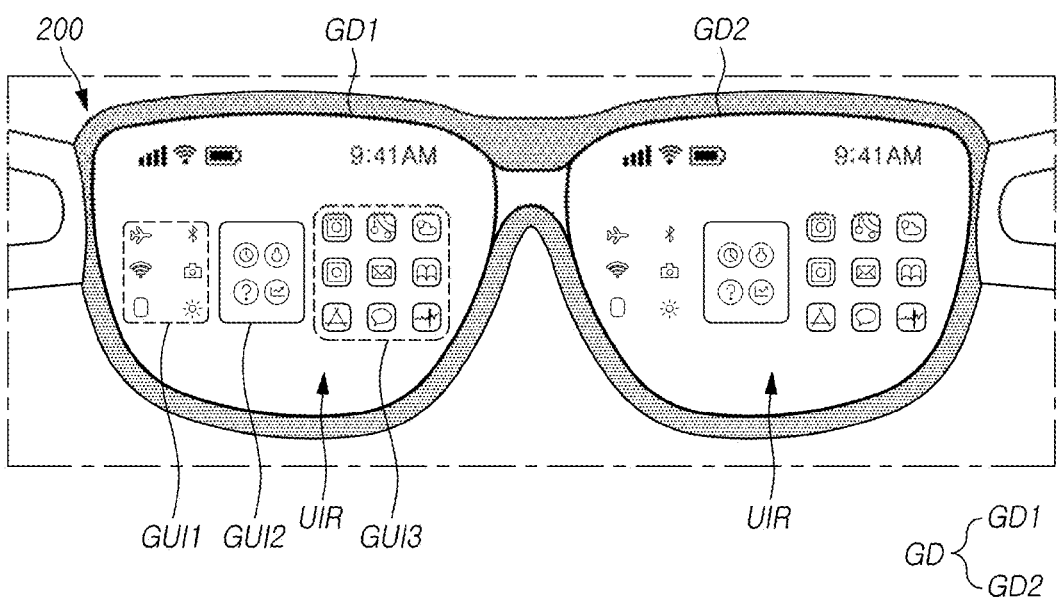
FIG. 13 illustrates an example of a display screen of an XR device according to an embodiment.
Figure 14:
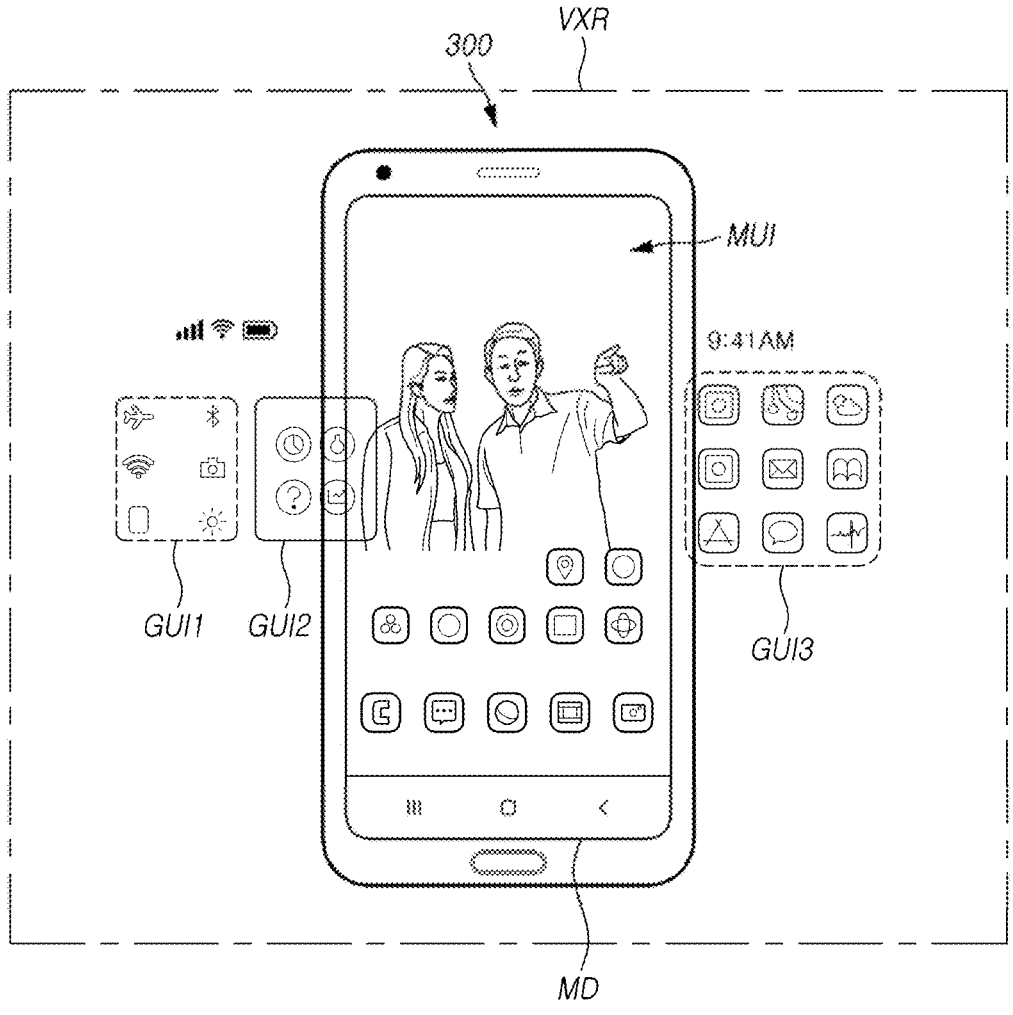
FIG. 14 illustrates an example of viewing a UE through an XR device according to an embodiment.

FIG. 13 illustrates an example of a display screen of an XR device 200 according to an embodiment. FIG. 14 illustrates an example of viewing an electronic device (e.g., a UE) 300 through an XR device 200 according to an embodiment.

In an example, the XR device 200 may display a user interface screen on the display GD. The XR device 200 may include a first display GD1 corresponding to the left eye and a second display GD2 corresponding to the right eye. The first display GD1 and the second display GD2 may be placed separately in different positions or be integrally formed. In an example, the XR device 200 may have a single display covering the left and right eyes both.

Referring to FIG. 13, the first display GD1 and the second display GD2 may display substantially the same user interface screen. Although both the first display GD1 and the second display GD2 display substantially the same user interface screen, the actual view perceived through the user's eyes may be represented as an XR view (e.g., the XR view VXR (view of extended reality) of FIGS. 14 to 16).

In an embodiment, the user interface screen displayed on the display GD of the XR device 200 may include a plurality of GUI elements GUI1, GUI2, and GUI3. The GUI elements GUI1, GUI2, and GUI3 may include, e.g., an application icon, a communication status icon, a battery status indication, and/or a time indication, but are not limited thereto. The GUI elements GUI1, GUI2, and GUI3 may include, e.g., a group of application icons, a group of communication status icons, a group of battery status indications, and/or a group of time indications, but are not limited thereto.

Referring to FIG. 14, in an embodiment, the display GD of the XR device 200 may be provided as a substantially transparent display. The transparent display may not only display an image on the display but receive the reflected light from the environment outside the transparent display therethrough. In an embodiment, the user wearing the XR device 200 configured as a transparent display may view the actual environment outside the display as well as the user interface screen UIR displayed on the display.

In a use case, the user may view the electronic device 300 while wearing the XR device 200. In this case, the user interface screen UIR displayed on the display GD provided in the XR device 200 may at least partially overlap the user interface screen MUI displayed on the display MD provided in the electronic device 300, obstructing the view of the user using of the electronic device 300.

Figure 15:
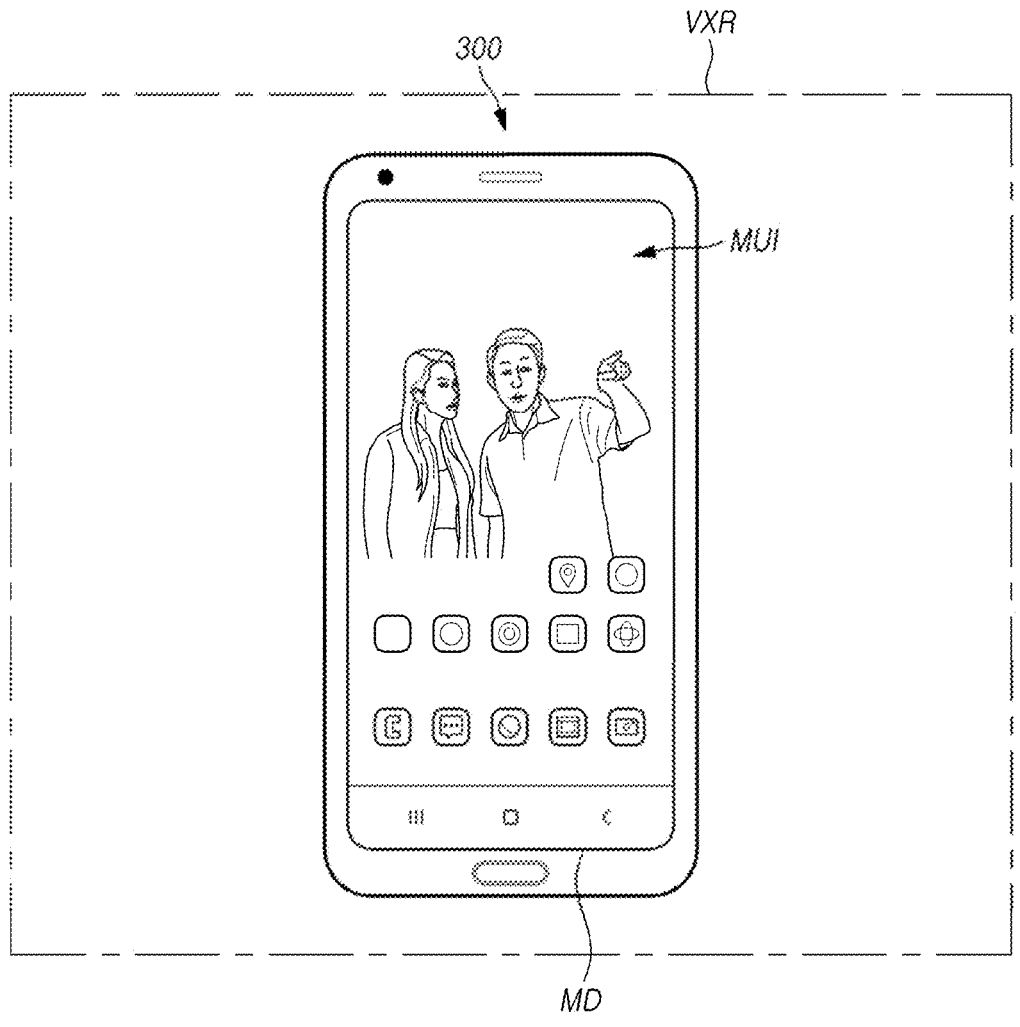
FIG. 15 illustrates an example of implementing a mobile use mode of an XR device according to an embodiment.
Figure 16:
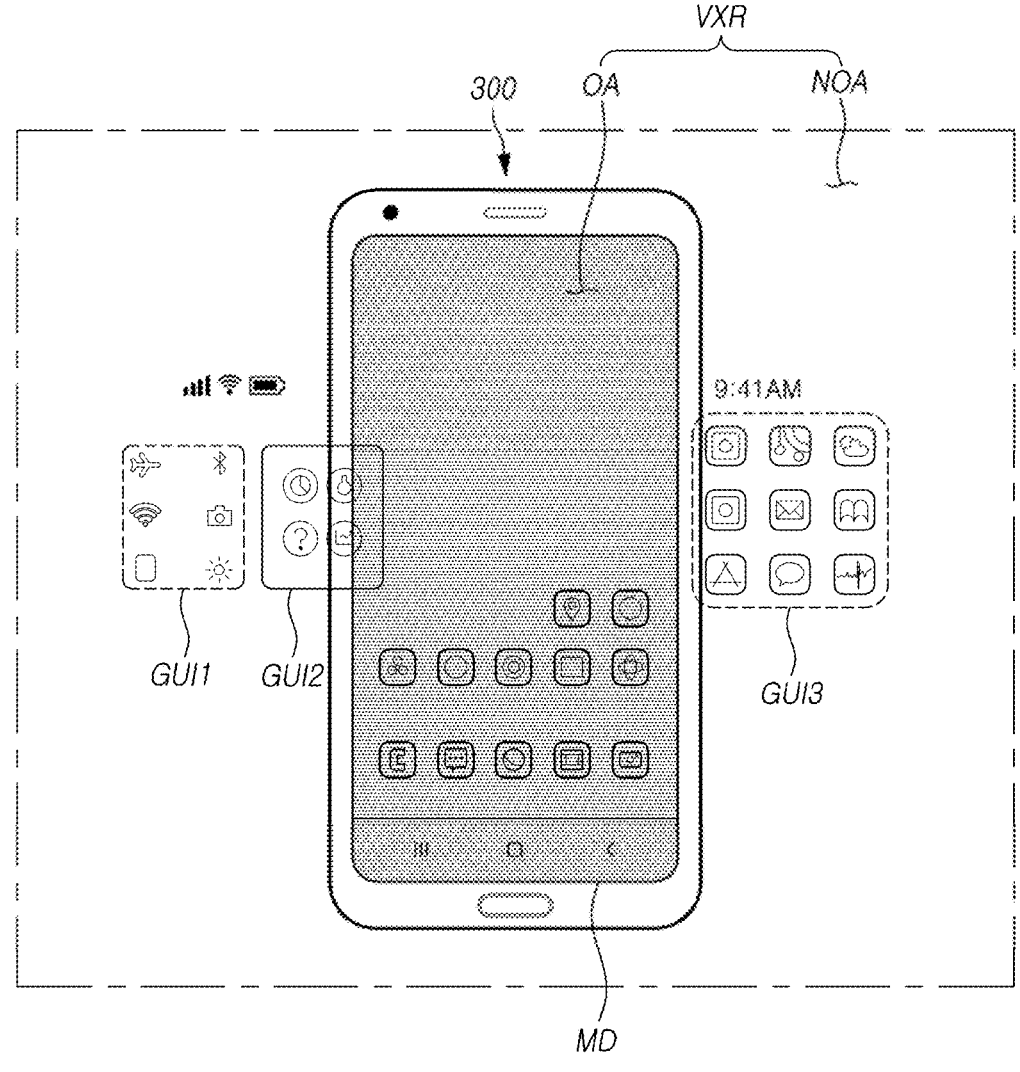
FIG. 16 illustrates an example of implementing a mobile use mode of an XR device according to an embodiment.

FIGS. 15 and 16 illustrate an example of implementing a mobile use mode of an XR device 200 according to an embodiment.

In an embodiment, an XR device (e.g., the XR device 200 of FIG. 13) may control not to display a user interface screen (e.g., the user interface screen UIR of FIG. 13) being displayed on the display (e.g., the display GD of FIG. 13) while operating in the mobile use mode. In other words, the XR device 200 may allow the whole or part of the user interface screen (e.g., the user interface screen UIR of FIG. 13) being displayed on the display to be deactivated.

In an embodiment, the XR device 200 may provide a service request signal related to unlocking to the electronic device 300 based on identifying the unlock trigger. The service request signal is an optical signal in which unlocking-related service information is encoded in the third field. In an embodiment, the electronic device 300 may output an ACK signal based on detecting the service request signal.

In an embodiment, the XR device 200 may switch the display operation mode based on identifying an unlock trigger. In an embodiment, the XR device 200 may switch the display operation mode from the normal mode to the mobile use mode based on detecting an ACK signal in response to the unlocking-related service request signal.

In an embodiment, the mobile use mode may include a mode to deactivate the XR view VXR on the display. The XR view VXR may include a user interface screen UIR displayed on the display of the XR device 200 and an actual scene including another electronic device 300. If the XR view VXR is deactivated, the XR device 200 may be controlled not to display the user interface screen UIR through the display GD.

For example, referring to FIG. 15, the user interface screen UIR being displayed through the first display (e.g., the first display GD1 of FIG. 13) and the second display (e.g., the second display GD2 of FIG. 13) may be stopped from being displayed on both. Accordingly, the XR device 200 may function as typical glasses or goggles.

In an embodiment, the mobile use mode may include or be configured as, a mode to deactivate the portion corresponding to the display MD of the electronic device 300 in the entire XR view VXR on the display GD.

For example, referring to FIG. 16, the XR view VXR may include an overlap area OA and a non-overlap area NOA. The overlap area OA means an area of the XR view VXR implemented by the XR device 200, overlapping the display screen of the electronic device 300, and the non-overlap area NOA means an area not overlapping the display screen by the electronic device 300.

The display screen of the electronic device 300 may be detected by one or more sensors provided forward of the XR device 200. The sensor may include, e.g., an optical sensor or an image sensor, but is not limited thereto. As an example, the XR device 200 may identify the position and area of the display MD of the electronic device 300 using the image sensor provided forward. Information related to the identified position and area of the display MD may be used to control the above-described display of the XR device 200.

As described above, since display information by the XR device 200 and display information by the electronic device 300 are mixed in the overlap area OA, any one of the two may obstruct the user's view. Thus, in an embodiment, the XR device 200 may control the display GD not to display at least a portion of the user interface screen UIR of the XR device 200, displayed in the position corresponding to the overlap area OA.

As shown in FIG. 16, at least a portion of the second GUI element GUI2 is displayed to overlap the display area of the electronic device 300. In this case, the XR device 200 may control the display GD not to display the second GUI element GUI2, at least partially overlapping the display area of the electronic device 300.

Specifically, the XR device 200 displays the plurality of GUI elements (e.g., the first to third GUIs GUI1, GUI2, and GUI3) on the display GD, and at least some (e.g., the second GUI element GUI2) of the plurality of GUI elements at least partially overlap the display screen of the electronic device 300. In this case, the XR device 200 may deactivate the display of the second GUI element GUI2.

In an embodiment, the XR device 200 may be preset to operate in any one mode among the above-described mobile use modes, but is not limited thereto. Further, the above-described operations may be performed while wireless connection between the XR device 200 and the electronic device 300 is maintained.

Figure 17:
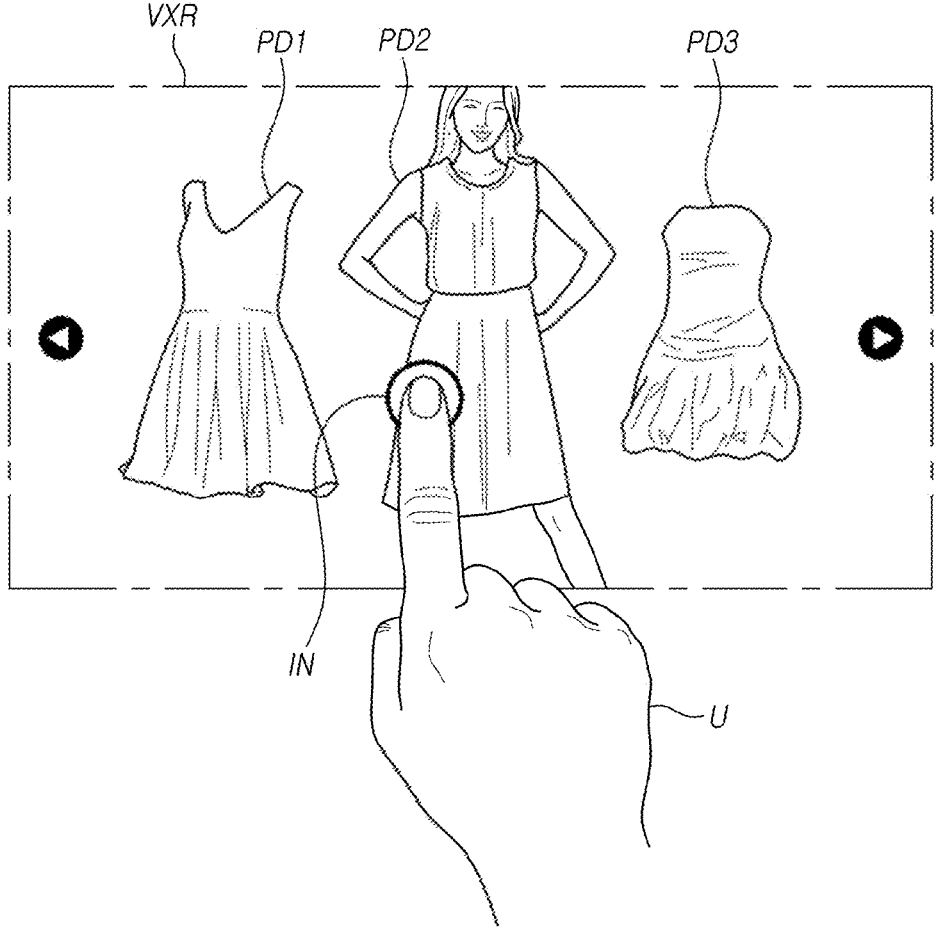
Figure 18:
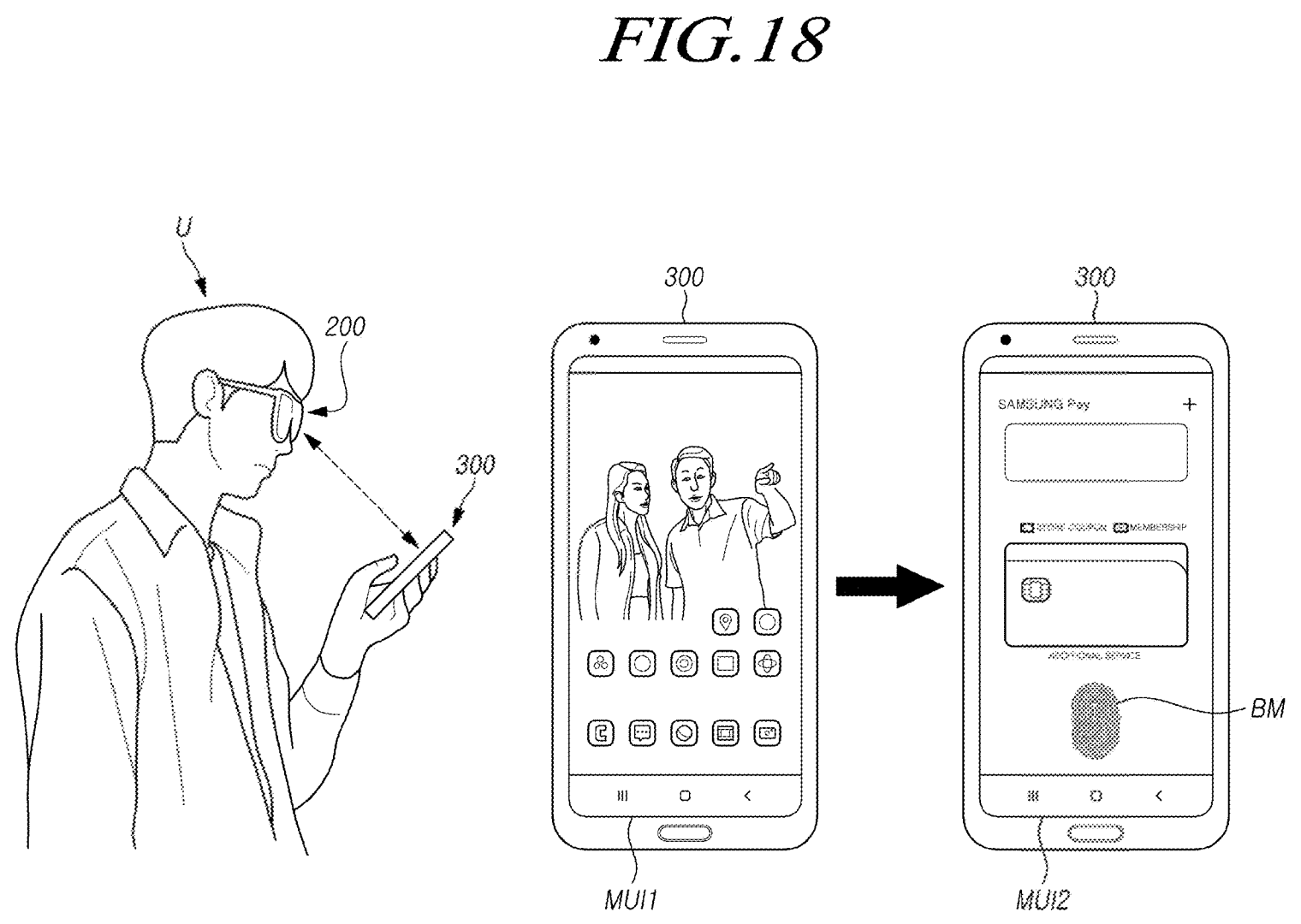
Figure 19:
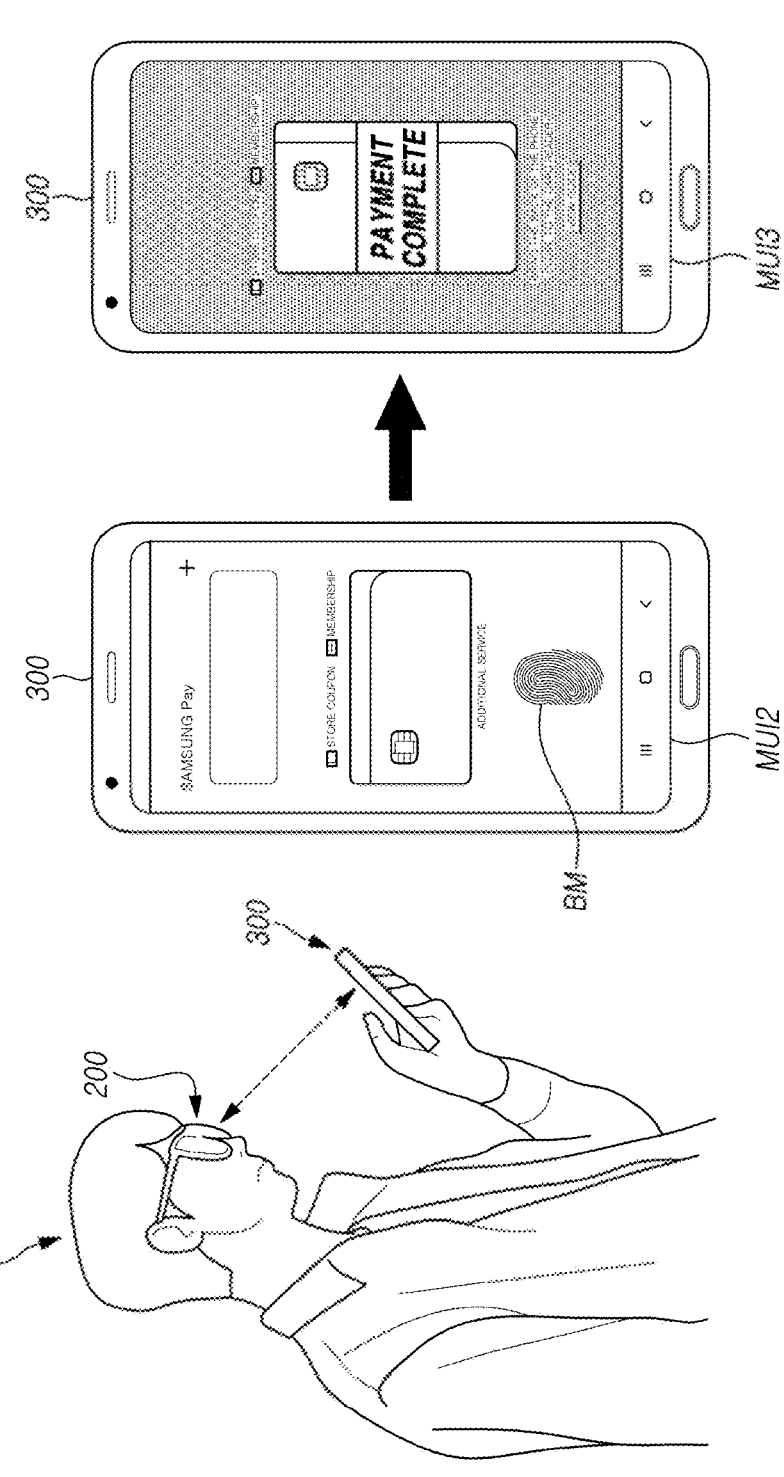
FIG. 19 illustrates an example of implementing an electronic payment using an XR device according to an embodiment.

FIGS. 17 to 19 illustrates an example of implementing an electronic payment using an XR device 200 according to an embodiment.

Referring to FIG. 17, an execution screen of an application for online shopping may display various products PD1, PD2, and PD3, and the user U may provide the XR device 200 with a gesture IN, as a user input, for selecting any one of the products PD1, PD2, and PD3. The gesture IN may be obtained by the image sensor provided forward of the XR device 200, but is not limited thereby.

In an embodiment, upon detecting a user input to determine to purchase a product on the XR device 200, the XR device 200 may generate purchase information regarding the product(s) to be purchased. The generated purchase information may be transmitted from the XR device 200 to the electronic device 300.

Meanwhile, in a use case of the XR device 200, the user may perform electronic payment using the XR device 200 and online shopping while wearing the XR device 200. In an embodiment, if the purchase information is generated, the XR device 200 may output a service request signal related to electronic payment simultaneously with or immediately before or after transmitting the generated purchase information to the electronic device 300. Specifically, the XR device 200 may output a service request signal related to electronic payment along with transmitting purchase information regarding the product(s) to be purchased to the electronic device 300, thereby requesting the electronic device 300 to perform an electronic payment process related to the transmitted purchase information.

In an embodiment, the electronic device 300 may transmit an electronic payment request to the network based on detecting the electronic payment-related service request signal. In this case, the electronic device 300 may transmit the electronic payment request to the seller server regardless of the result of biometric authentication to finish the electronic payment as described above.

In an embodiment, the electronic device 300 may execute a payment application based on detecting the electronic payment-related service request signal. Although not limited thereto, the electronic device 300 executing the payment application in response to detection of the service request signal may transmit, to the network, an electronic payment request associated with the purchase information received from the XR device 200 using the payment application.

Meanwhile, referring to FIG. 18, in an embodiment, the electronic device 300 detecting the electronic payment-related service request signal may execute the payment application. Although not limited thereto, as the payment application is executed, the application execution screen MUI1 being currently displayed by the electronic device 300 may be changed into the payment application execution screen MUI2 that is then displayed. The payment application execution screen MUI2 may include, e.g., a GUI for displaying the fingerprint-recognizable area BM (hereinafter, fingerprint input area BM). Upon receiving the user's fingerprint input to the fingerprint input area BM, the electronic device 300 may perform user authentication by comparing pre-registered fingerprint information with the input fingerprint information. Upon determining that the registered fingerprint information does not substantially match the received fingerprint information, the electronic device 300 may transmit an electronic payment request to the network.

Referring to FIG. 19, in an embodiment, upon detecting an electronic payment-related service request signal while executing the payment application, the electronic device 300 may transmit an electronic payment request to the network regardless of fingerprint information. Although not limited thereto, as the electronic payment request is transmitted to the network, the application execution screen MUI1 being currently displayed by the electronic device 300 may be changed into the payment application execution screen MUI3 that is then displayed.

The electronic device according to various embodiments may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 200 or 300 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD)). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that the above-described embodiments, and their technical features, may be combined with one another in each and every combination, potentially unless there is a conflict between two embodiments or features. That is, each and every combination of two or more of the above-described embodiments is envisaged and included within the disclosure. One or more features from any embodiment may be incorporated in any other embodiment, and provide a corresponding advantage or advantages.

What is claimed is:

1. An extended reality (XR) device, comprising:
a display;
memory;
an optical sensor including a receiver for detecting an optical signal encoded as a barcode and an emitter for outputting the optical signal encoded as the barcode; and
a processor electrically connected with the display, the memory, and the optical sensor,
wherein the processor is configured to:
generate a service request signal including a first code indicating service information associated with a user registration,
output the service request signal through the emitter,
identify a second code indicating user information from a service response signal received through the receiver, and
store the second code in the memory.

2. The XR device of claim 1, wherein the service request signal and the service response signal include two or more fields, and wherein the user information and the service information are configured in different fields.

3. The XR device of claim 1, wherein the service request signal and the service response signal include at least one of a first field related to an acknowledgment (ACK)/non-acknowledgment (NACK), a second field related to a transmission/reception entity, a third field related to the service information, a fourth field related to the user information, and a fifth field related to transmission complete.

4. The XR device of claim 3, wherein the service information further includes information associated with at least one of device connection, unlocking, and electronic payment, and wherein the third field is configured to include a code related to any one of the user registration, the device connection, the unlocking, and the electronic payment.

5. The XR device of claim 4, further comprising a transceiver,
wherein upon generating the service request signal in which the user registration-related code is configured in the third field, the processor is configured to:
store the user information included in the service response signal in the memory, and control the transceiver to transmit a wireless connection request to an electronic device providing the service response signal.

6. The XR device of claim 4, further comprising a transceiver,
wherein upon generating the service request signal in which the device connection-related code is configured in the third field, the processor is configured to:
compare the user information included in the service response signal with user information previously stored in the memory, and
control the transceiver to transmit a wireless connection request to an electronic device providing the service response signal, based on the user information previously stored in the memory corresponding to the user information included in the service response signal.

7. The XR device of claim 4, wherein upon generating the service request signal in which the device connection-related code is configured in the third field and while maintaining wireless connection based on the user information included in the service response signal, the processor is configured to:
output the service request signal in which the unlocking-related code is configured in the third field in response to identifying an unlock trigger, and
deactivate an XR view on the display based on receiving an ACK signal in response to the service request signal.

8. The XR device of claim 4, wherein upon generating the service request signal in which the device connection-related code is configured in the third field and while maintaining wireless connection based on the user information included in the service response signal, the processor is configured to:
output the service request signal in which the unlocking-related code is configured in the third field in response to identifying an unlock trigger, and
deactivate a portion corresponding to a display screen of an electronic device outputting the service response signal, of an entire XR view area on the display based on receiving an ACK signal in response to the service request signal.

9. The XR device of claim 4, wherein upon generating the service request signal in which the device connection-related code is configured in the third field and while maintaining wireless connection based on the user information included in the service response signal, the processor is configured to output the service request signal in which the electronic payment-related code is configured in the third field in response to identifying an electronic payment trigger.

10. The XR device of claim 3, wherein the processor is configured to periodically output the service request signal and, upon identifying the first field of the service response signal as an ACK, stop outputting the service request signal.

11. The XR device of claim 3, wherein the first to fifth fields are configured as binary codes, and wherein the binary codes of the first field and the fifth field have a front and rear reversed from each other.

12. The XR device of claim 1, wherein the service request signal and the service response signal are configured as light in a near infrared wavelength band.

13. An XR device, comprising:
a transceiver;
a display;
memory;
an optical sensor including a receiver for detecting an optical signal encoded as a barcode and an emitter for outputting the optical signal encoded as the barcode; and a processor electrically connected with the transceiver, the display, the memory, and the optical sensor, wherein the processor is configured to:

generate a service request signal including a first code for device connection, and output the service request signal through the emitter, identify a second code indicating user information from a service response signal received through the receiver, and based on the user information identified from the service response signal corresponding to user information previously stored in the memory, control the transceiver to transmit a message for requesting a wireless connection to an electronic device providing the service response signal.

14. The XR device of claim 13, while the wireless connection is maintained, the processor is configured to generate an unlock request signal including service information for controlling the electronic device to switch an unlock screen of the electronic device to another application execution screen, as a plurality thereof and deactivates at least a portion of a user interface screen output on the display in response to receiving an ACK signal for the unlock request signal.

15. An electronic device, comprising:

a transceiver;

a display;

memory;

an optical sensor including a receiver for detecting an optical signal encoded as a barcode and an emitter for outputting the optical signal encoded as the barcode; and a processor electrically connected with the transceiver, the display, the memory, and the optical sensor, wherein the processor is configured to:

detect a service request signal through the receiver, generate a service response signal including user information based on identifying service information requesting device connection from the service request signal, output the service response signal through the emitter, and form a wireless connection with a device outputting the service request signal in response to receiving a wireless connection request from the device through the transceiver.

16. The electronic device of claim 15, wherein the service request signal and the service response signal include two or more fields, and wherein the user information and the service information are configured in different fields.

17. The electronic device of claim 15, wherein the service request signal and the service response signal include at least one of a first field related to an acknowledgment (ACK)/non-acknowledgment (NACK), a second field related to a transmission/reception entity, a third field related to the service information, a fourth field related to the user information, and a fifth field related to transmission complete.

18. The electronic device of claim 17, wherein the service information further includes information associated with at least one of device connection, unlocking, and electronic payment, and wherein the third field is configured to include a code related to any one of the user registration, the device connection, the unlocking, and the electronic payment.

19. The electronic device of claim 17, wherein the first to fifth fields are configured as binary codes, and wherein the binary codes of the first field and the fifth field have a front and rear reversed from each other.

20. The electronic device of claim 15, wherein the service request signal and the service response signal are configured as light in a near infrared wavelength band.

* * * * *